United States Patent [19]

Nakahira

[11] 4,370,371
[45] Jan. 25, 1983

[54] RUBBER DISC FOR A RECORD PLAYER TURNTABLE

[75] Inventor: Akitaro Nakahira, Takarazuka, Japan

[73] Assignee: Hohyu Rubber Co., Ltd., Osaka, Japan

[21] Appl. No.: 285,102

[22] PCT Filed: Nov. 18, 1980

[86] PCT No.: PCT/JP80/00282

§ 371 Date: Jul. 16, 1981

§ 102(e) Date: Jul. 16, 1981

[87] PCT Pub. No.: WO81/01481

PCT Pub. Date: May 28, 1981

[30] Foreign Application Priority Data

Nov. 20, 1979 [JP] Japan ................................ 54-151123
Feb. 1, 1980 [JP] Japan ................................ 55-11619
Oct. 13, 1980 [JP] Japan ................................ 55-143417
Oct. 13, 1980 [JP] Japan ................................ 55-143418
Oct. 15, 1980 [JP] Japan ................................ 55-144998

[51] Int. Cl.³ .......................... B32B 3/02; G11B 3/62
[52] U.S. Cl. ...................................... 428/65; 428/156;
428/495; 428/423.9; 428/421; 346/135.1;
264/153; 264/201; 264/294; 264/322; 428/447;
428/516; 428/517; 428/520; 428/521; 428/522;
428/523
[58] Field of Search ................ 428/65, 516, 517, 156,
428/522, 520, 495, 521, 423.9, 523, 421, 447;
248/349; 346/135.1; 264/153, 201, 322, 294

[56] References Cited

U.S. PATENT DOCUMENTS

| | | | |
|---|---|---|---|
| 2,351,293 | 6/1944 | Saunders | 248/349 |
| 3,130,110 | 4/1964 | Schmidt | 346/135.1 |
| 3,285,561 | 11/1966 | George | 248/349 |
| 3,455,531 | 7/1969 | Baker | 248/349 |
| 3,900,999 | 8/1975 | Callan | 428/495 |

FOREIGN PATENT DOCUMENTS

| | | |
|---|---|---|
| 58024 | 7/1921 | Japan . |
| 30-6520 | 9/1955 | Japan . |
| 43-21071 | 9/1968 | Japan . |
| 51-75202 | 6/1976 | Japan . |
| 52-20803 | 2/1977 | Japan . |
| 53-17703 | 2/1978 | Japan . |
| 53-24605 | 3/1978 | Japan . |

Primary Examiner—P. Ives
Attorney, Agent, or Firm—Armstrong, Nikaido, Marmelstein & Kubovcik

[57] ABSTRACT

A rubber sheet for a turntable characterized by being a cured molding of a rubber composition, the cured molding having a hardness within the range from 30° as measured with an A-type rubber hardness tester to 15° as measured with an F-type rubber hardness tester and an impact resilience of not less than 40%. This rubber sheet effectively prevents the tone quality of reproduced sounds from deteriorating due to howling or external vibrations and permits reproducing source sounds faithfully.

25 Claims, 27 Drawing Figures $h_2$   $h_1$ $h_4$   $h_3$ $h_6$   $h_5$ $h_7$   $h_8$

RUBBER DISC FOR A RECORD PLAYER TURNTABLE

TECHNICAL FIELD

This invention relates to a rubber sheet for the turntable of a record player.

BACKGROUND ART

The rubber sheet for turntable is used to isolate a disc record from acoustic outputs from a loudspeaker, vibrations of a record player itself, etc., thereby preventing the occurrence of howling and the deterioration of SN ratio due to vibrations of the disc record itself during its reproduction. The howling is a sort of oscillation phenomena due to the feedback of acoustic outputs from a loudspeaker to a pickup and occurs due to the transmission of vibrations from the speaker to the record player via the floor or rack where the record player is mounted, or due to the direct vibrations of the record player cabinet caused by a sound pressure from the loudspeaker. It is needless to say that any normal playback of the disc record cannot be effected when the howling occurs. Even where no howling takes place, the frequency response of the pickup output would be altered and local resonance and the like would be caused by such external vibrations, and the tone quality of reproduced sounds would be affected adversely by the increase of inter-modulation distortion, the deterioration of transient phenomena, etc. The howling takes place mostly due to external vibrations from the floor or rack where the record player is mounted. The majority of such external vibrations is of the order not more than 100 Hz and particularly includes a superlow frequency component of approximately 5 to 10 Hz. To provide for an effective inhibition of howling, a rubber sheet for turntable which exhibits excellent vibration-absorbing properties in such superlow frequency region is desirable.

However, conventional rubber sheets for turntable which are made of natural rubber, isoprene rubber, chloroprene rubber, butyl rubber, styrene-butadiene rubber, butadiene rubber, silicone rubber or urethane rubber, or mixtures thereof are inferior in vibration-absorbing properties, especially in the superlow frequency range, and are unable to protect effectively the tone quality of reproduced sounds from deteriorating due to howling or external vibrations.

DISCLOSURE OF INVENTION

The inventor has made extensive and thorough researches on the development of a rubber sheet for turntable which effectively inhibits the tone quality of reproduced sounds from deteriorating due to howling or external vibrations and permits reproduced sounds as faithful as source sounds themselves (for example, human voices themselves). As a result, it has been found that the above described object can be achieved by a rubber sheet which is a sheet-like cured molding of a rubber composition and has a hardness within the range from 30° as measured with an A-type rubber hardness tester to 15° as measured with an F-type rubber hardness tester and an impact resilience of not less than 40%.

In the foregoing, the A-type rubber hardness tester is a rubber hardness tester provided in JIS K 6301-1969. Further, the F-type rubber hardness tester means Asker F-type rubber hardness tester made by Kobunshi Keiki Mfg. Co., Ltd., which is mainly used for measurements of hardness of foam rubber, urethane foam or the like. Although being solid rubber, some of the cured rubber in accordance with the present invention is too low in hardness to measure by means of the A-type rubber hardness tester which is used in measuring hardness of conventional solid rubbers. To this end, the lower limit of hardness of the cured rubber in accordance with the present invention is defined by the hardness value as measured with the F-type rubber hardness tester.

An intermediate hardness between the measuring range of the A-type rubber hardness tester and that of the F-type rubber hardness tester may be measured with a C-type rubber hardness tester. The C-type rubber hardness tester as used herein means one provided in the Society of Rubber Industry Japan Standard SRIS-0101 and is used to measure such intermediate hardnesses between the measuring ranges of the A-type and F-type rubber hardness testers. The C-type rubber hardness tester is mostly used to measure the hardness of sponge, soft rubber or the like. As the C-type rubber hardness tester, Asker C-type rubber hardness tester made by Kobunshi Seiki Mfg. Co., Ltd. is used.

The hardness of the cured rubber in accordance with the present invention may be determined with any of the A-type rubber hardness tester, the C-type rubber hardness tester and the F-type rubber hardness tester, if the measurement is possible with any of these rubber hardness testers. However, if a hardness as measured with the A-type rubber hardness tester is not more than 1°, it is preferable to measure the hardness with either the C-type rubber hardness tester or the F-type rubber hardness tester because the measurement with the A-type rubber hardness tester accompanies increased errors. Similarly, if a hardness as measured with the C-type rubber hardness tester is not more than 1°, it is preferable to measure the hardness with the F-type rubber hardness tester. Furthermore, if a hardness as measured with the C-type rubber hardness tester is not less than 99°, it is preferable to measure the hardness with the A-type rubber hardness tester. Similarly, if a hardness as measured with the F-type rubber hardness tester is not less than 99°, it is preferable to measure the hardness with the C-type rubber hardness tester or the A-type rubber hardness tester. The hardness values measured with the A-type rubber hardness tester, the C-type rubber hardness tester and the F-type rubber hardness tester will hereinafter be referred to as A hardness, C hardness and F hardness, respectively.

The cured rubber in accordance with the present invention bears a hardness of not more than 30°, preferably not more than 20° in A hardness to not less than 15°, preferably not less than 30° in F hardness and an impact resilience of not less than 40%, preferably not less than 50%, most preferably from 60 to 95%. Such a cured rubber is a novel rubber material which has not been known heretofore. That is, in the case of conventional cured rubbers, those with a hardness of not more than about 30° have an impact resilience of less than about 40%, and those with an impact resilience of not less than about 40% have a hardness of more than about 30°. It is common knowledge that the impact resilience of cured rubber declines with a decrease in its hardness. The physical properties of the cured rubber of the present invention, i.e. an A hardness of not more than 30°, preferably not more than 20°, and an impact resilience of not less than 40%, preferably not less than 50%, most preferably from 60 to 95%, are definitely outside of the prior common concept.

The rubber sheet for turntable made of the above-described unique cured rubber in accordance with the present invention exhibits such a remarkable effect that it shows an excellent vibration-absorbing property expecially in superlow frequency range and prevents the tone quality of reproduced sounds from deteriorating due to howling or external vibrations. That is, the rubber sheet effectively absorbs and shields off vibrations of the above-mentioned superlow frequencies, particularly those of not more than 10 Hz, and isolates a disc record from these vibrations, so that the occurrence of howling is prevented effectively and there are no dangers such as the modulation of pickup outputs by these vibrations. Accordingly, especially the maximum treble sounds in soprano of female vocal sounds can be reproduced as they are and there can be also obtained excellent reproduced sounds in bass range. Thus listeners can enjoy a listening of a record with enriched impressions of presence.

It is necessary that the cured rubber in accordance with the present invention has a hardness in the range from an A hardness of not more than 30°, preferably not more than 20° to an F hardness of not less than 15°, preferably not less than 30° and an impact resilience of not less than 40%, preferably not less than 50%, most preferably from 60 to 95%. Only when the hardness and impact resilience fall within the above defined ranges, the cured rubber can exhibit excellent vibration-absorbing properties, especially in the superlow frequency range and prevent the tone quality of reproduced sounds from deteriorating due to howling or external vibrations with maintaining the general properties as a rubber sheet for turntable. If the hardness is higher than the above range and the impact resilience is lower than the above range, the vibration-absorbing properties become poor especially in the superlow frequency range. Furthermore the property being soft and resilient like baby skin, which is one of the most significant features of the cured rubber of the present invention, becomes lost. As a result, the rubber sheet does not come tightly in contact to the disk record or turntable, nor does it ensure a breathing phenomenon thereabove and below (this will be described in detail later). If both hardness and impact resilience are below the above ranges, the rubber sheet has only a scarce self-supporting property and cannot undergo the weights of a disc record, a cartridge and a tone arm, resulting in that its original shape cannot be maintained. More particularly, the projections which are provided on the rubber sheet as described later become deformed and flat, so that the contact surface area between the rubber sheet and a disc record or turntable is increased and the reproduced sounds tend to become heavy. Therefore, it is impossible to reproduce clear and steady source sounds in both treble and bass regions.

The rubber sheet of the present invention can be classified into the following three categories, depending on its physical properties, mainly on the basis of differences in hardness:

(I) The rubber sheet having a hardness of from more than 15° to not more than 30° in A hardness and an impact resilience of not less than 50%, particularly from 65 to 95%. The rubber sheet of this category permits especially the reproduction of sounding sounds. Consequently, for example, sounding sounds of a pipe organ or the like can be reproduced as they are and the maximum treble sounds in the soprano of female vocal sound can be reproduced beautifully.

(II) The rubber sheet having a hardness of from 1° to 15°, preferably from 2° to 7° in A hardness and an impact resilience of from 40 to 90%, more preferably from 50 to 95%, most preferably from 60 to 95%. The rubber sheet of this category possesses the advantages of both of the rubber sheets belonging to the category (I) and the category (III) discussed below.

(II) The rubber sheet having a hardness from less than 1° in A hardness to not less than 15°, preferably not less than 30° in F hardness and an impact resilience of not less than 40%, more particularly 50 to 95%. The rubber sheet of this category inhibits howling more sufficiently and permits reproducing more excellent sounds of superlow frequencies.

It is further desirable that, in addition to the above defined physical properties, the cured rubber in accordance with the present invention bears a tensile strength of 0.1 to 100 kg./cm.$^2$, more preferably 1 to 50 kg./cm.$^2$, an elongation of 50 to 1,000%, more preferably 200 to 1,000% and a specific gravity of 0.8 to 1.3, more preferably 0.89 to 1.05. If the tensile strength is less than the above range, the rubber sheet shows a scarce self-supporting property and becomes fragile and easily broken upon application of small tensile force. Contrarily, if it is greater than the above range, the rubber sheet loses flexibility and fails to come tightly in contact to the disk record or the turntable. If the elongation is less than the above range, the breathing as stated above is difficult. On the other hand, if the elongation is less than the above range, the rubber sheet tends to be extended to the maximum and sagged. If the specific gravity is more than the above range, an excess load is applied to a driving motor for the turntable, provided that the average thickness of the rubber sheet is more than 2 mm., thus amplifying vibration sounds of the motor. On the other hand, if the specific gravity is less than the above range, it becomes impossible to add fillers to the rubber composition, so that it is difficult to obtain a rubber sheet having a minimum self-supporting property.

Preferred physical constants for rubber sheets of the above-defined categories (I) to (III) are as follows:

Category (I)
Tensile strength: 1 to 100 kg./cm.$^2$, particularly 5 to 50 kg./cm.$^2$
Elongation: 100 to 1,000%, particularly 200 to 1,000%
Specific gravity: 0.89 to 1.05
Category (II)
Tensile strength: 1 to 50 kg./cm.$^2$, particularly 3 to 50 kg./cm.$^2$
Elongation: 100 to 1,000%, more preferably 120 to 1,000%, and most preferably 200 to 1,000%
Specific gravity: 0.89 to 1.05, particularly 0.93 to 1.05
Category (III)
Tensile strength: 0.1 to 50 kg./cm.$^2$, particularly 0.1 to 20 kg./cm.$^2$
Elongation: 100 to 1,000%, particularly 200 to 1,000%
Specific gravity: 0.89 to 1.05

The cured rubber having the above specific physical constants can be obtained by curing a rubber composition which comprises (A) 100 parts (parts by weight, the same hereinafter) of a rubber component, (B) 1 to 2,000 parts, preferably 5 to 2,000 parts, most preferably 100 to 1,500 parts of a factice and (C) 20 to 2,000 parts, preferably 50 to 2,000 parts, most preferably 200 to 1,500 parts of a softening agent. The rubber composition obtained by adding such large amounts of a factice and a softening agent to a rubber component is a new rubber composition. Only by curing such a new rubber composition, there can be obtained a particular cured rubber having a hardness of not more than 30°, particularly not more than 20° in A hardness and an impact resilience of not less than 40%, preferably not less than 50%, most preferably from 60 to 95%.

The rubber component (A) is not particularly limited. There are exemplified rubber components composed of predominantly one or more members of polynorbornene, natural rubber, isoprene rubber, chloroprene rubber, styrene-butadiene rubber, butadiene rubber, butyl rubber, ethylene-propylene rubber, ethylene-propylene-diene rubber, nitrile rubber, acryl rubber, urethane rubber, chlorinated polyethylene, chlorosulfonated polyethylene, epichlorohydrin rubber, polysulfide rubber, silicone rubber and the like. These rubber components include regenerated rubbers thereof (for example, rubber powder or the like). Furthermore, these rubber components may be either in the form of solid (powder, pellet, block, sheet, etc.) or in the form of liquid (liquid rubber, latex, etc.). Out of these components, a rubber component composed of polynorbornene as a predominant component is particularly preferable in the present invention. In that case, it is desirable that the proportion of polynorbornene is not less than 50% (% by weight, the same hereinafter), more preferably not less than 65% on the basis of the total weight of the rubber component. As polynorbornene, there are preferably used those having an average molecular weight of about $10^6$ to about $5 \times 10^6$, more preferably about $2 \times 10^6$ to about $3 \times 10^6$.

The factice as the component (B) includes any of various kinds of factices such as white factice, black factice, amber factice and blue factice which are available by vulcanizing a variety of vegetable oils including linseed oil, rapeseed oil, soybean oil, sesame oil, tung oil and castor oil with use of sulfur or sulfur chloride. Those factices may be used alone or in admixture. The factice prepared by vulcanizing rapeseed oil is most favorable.

The softening agent as the component (C) includes oils, plasticizers and other agents having a softening activity. The oils include any of aromatic oils, naphthenic oils, paraffinic oils, vegetable oils and animal oils and the like which are commonly used as a filling oil (softening oil, process oil, etc.) for rubbers. The vegetable oils and animal oils mentioned above include, for example, castor oil, rapeseed oil, linseed oil, whale oil, fish oil and the like. As the plasticizers, there can be used any of those having a high softening performance out of plasticizers usually used as a plasticizer for rubbers. For example, there are exemplified dibutyl phthalate, dioctyl phthalate and dioctyl sebacate. Other softening agents include liquid rubbers. The softening agents mentioned above may be used alone or as a mixture. Usually oil alone or in mixture with a plasticizer is preferable.

Moreover, to the above-mentioned rubber composition there may be added properly common rubber additives including fillers such as carbon black and zinc oxide, colorants, lubricants such as stearic acid and antioxidants to the extent that they do not impair the above-discussed physical properties, in addition to the components (A) to (C).

Preferred rubber compositions for the rubber sheets of the categories (I) to (III) are as follows:
Category (I)
Component (A) 100 parts
Component (B) 1 to 1,500 parts, preferably 5 to 1,000 parts and most preferably 100 to 1,000 parts
Component (C) 20 to 1,500 parts, more particularly 200 to 1,000 parts
Category (II)
Component (A) 100 parts
Component (B) 5 to 1,500 parts, preferably 5 to 500 parts and most preferably 100 to 500 parts
Component (C) 50 to 1,500 parts, more particularly 200 to 1,000 parts
Category (III)
Component (A) 100 parts
Component (B) 20 to 2,000 parts, preferably 50 to 1,500 parts and most preferably 100 to 1,500 parts
Component (C) 50 to 2,000 parts, preferably 200 to 1,500 parts For curing of the above rubber composition, any one of usual curing systems can be used. Either sulfur curing or sulfurless curing may be used. The curing conditions, etc. are not particularly limited and normal conditions are adopted.

A typical example of the above rubber composition, in the case of sulfur curing, is as follows:

| (Component) | (Parts) |
| --- | --- |
| Rubber component | 100 |
| Factice | 100 to 1,500 |
| Softening agent | 200 to 1,500 |
| Filler | 1 to 200 |
| Antioxidant | 0.5 to 6 |
| Sulfur | 0.5 to 10 |
| Curing accelerator | 1 to 20 |

As another feature of the rubber sheet for turntable in accordance with the present invention, there is no need for after-treatments which are generally adopted in the case of a conventional rubber sheet for turntable, for example, the application of halogenation treatment for ensuring increased surface hardness to make the rubber sheet not susceptible to flaws and the application of a coating onto the surface thereof for preventing deposit of dust. While being very low in hardness as set forth above, the rubber sheet for turntable in accordance with the present invention is high in impact resilience. For the reason, the rubber sheet has characteristic properties that it is hardly susceptible to flaws and that dust is hardly deposited thereon. Moreover, the rubber sheet has a very convenient characteristic property that even when flaw is made or dust is attached on the rubber sheet, the flaw disappears and the dust is removed, if the rubber sheet is swung or crumpled with ease like cloth since it is very soft. The rubber sheet of the present invention has another characteristic property, not experienced with a conventional rubber sheet, that washing in water is effective and in that case the rubber sheet can be cleaned by washing with crumpling.

The rubber sheet for turntable in accordance with the present invention is subjected to no particular limitations as to configuration and any of conventional configurations can be adopted. However, by limiting the configuration of the rubber sheet to the following particular ones, more excellent vibration-absorbing effect and tone quality improving effect can be exhibited in combination with the above-mentioned specific physical properties.

That is, a preferable configuration of the rubber sheet for turntable in accordance with the present invention includes one wherein a large number of projections are provided on one surface of its disk-shaped sheet body.

Since the rubber sheet with the above configuration contacts a turntable or a disc record only atop the projections thereof, the contact area is markedly small and therefore external vibrations are hardly transmitted to the disc record. Furthermore, the turntable rubber sheet with the above configuration exhibits such a unique effect as in the followings:

That is, the substance with the smallest velocity of sound is rubber and that with the second smallest velocity of sound is air. When the surface of the rubber sheet with the above specific configuration is in contact with the turntable, a thin layer of air is present between the rubber sheet and the turntable by means of the projections so that the air in this layer moves inwardly and outwardly through respective ones of the projection-to-projection spaces during the revolution of the turntable, as if the human being breathes. Consequently, the rubber sheet and the disc record thereon would be in such a situation as resting on air. This insures complete isolation of the external vibrations and an improvement in tone quality. Similarly, in the case where the surface of the rubber sheet with the above specific configuration is in contact with the disc record, the foregoing specific situation occurs between the rubber sheet and the disc record. Thus, the above configuration effectively shields off vibrations of superlow frequencies, particularly not more than 10 Hz and prevents these vibrations from being transmitted to the disc record. For this reason, the occurrence of howling is effectively prevented and there is no danger that pickup outputs would be modulated with these vibrations.

In the rubber sheet with the above specific configuration, the shape of the projections is not particularly limited and various shapes can be adopted. However, in view of reducing the contact area with the turntable or the disc record as small as possible, such a shape that the area of the head of each projection is as small as possible is preferable. Such a projection includes one having a shape wherein at least the head of the projection is ridge-shaped to make substantially a line contact with the turntable or the disc record. The shapes according to this embodiment may be, for example, roof-shaped and semicircular in section. A projection with knife edge-shaped head is particularly preferred. Another desirable projection includes one having a shape wherein at least the head of the projection is pointed to make substantially a point contact with the turntable or the disk record. The shapes according to this embodiment include a pyramid (including a polygonal pyramid, e.g. a triangular pyramid, a quadrangular pyramid and so on, the same hereinafter), a cone (including an elliptical cone, the same hereinafter), a dome (including a near sphere, a hemisphere, a column with a rounded upper portion and the like, the same hereinafter) and the like. A projection having such a sharp head as a needle is particularly preferred. For the projections with the two different kinds of shape, it is enough that at least the head thereof is ridge-shaped or pointed, and the shape of the root thereof is not particularly limited. For example, such a projection may have a shape wherein a head having a roof shape, semicircular shape, a pyramid, a cone, a dome or the like is rode on a root of a head-free pyramid, a head-free cone or the like. Furthermore, other shapes are available as long as the contact area with the turntable or the disc record is held as small as possible. For example, head-free pyramidal, pillar-shaped or column-shaped projections may be used. These projections may be provided at their top with recesses to ensure a line contact or a point contact.

It is preferable that the contact area between the projection-bearing surface and the turntable or the disk record be 0.01 to 10%, particularly 0.01 to 1% of the entire area of one surface of the rubber sheet (i.e. the area of a circle having the same diameter as that of the rubber sheet, the same hereinafter).

The height of the projections is preferably 0.1 to 5 mm., more particularly 0.3 to 1.8 mm. When the height is outside the above range, the air-breathing behavior as mentioned above occurs with difficulty.

The projections may be disposed regularly or at random on the body of the rubber sheet. Regular alignments may be concentrically circular, spiral, radial, etc. The individual projections may be either spaced at an appropriate interval or closely aligned in contact with one another, or the combination of these alignments may be also adopted. When these projections are closely aligned, the adjacent projections may be connected integrally with each other at their roots (in the case where the projections are closely aligned in concentrically circular arrays in such a manner, its configuration is similar to a configuration wherein concentrically circular ribs are provided on the body of the rubber sheet, each ribs being provided with closely spaced recesses). Preferable alignment includes one wherein the projections are closely aligned in concentrically circular arrays or the like so that air is held in a space between the rubber sheet and the turntable or the disc record by the arrays of the projections. According to the arrangement of this embodiment, the air involved passes through the gaps between the closely aligned projections, thus providing better breathing behavior. As a result, more excellent vibration-damping effect and tone quality improving effect can be exhibited.

The projections as mentioned above may be formed integrally with the rubber sheet, or formed separately from the rubber sheet and affixed thereto by means such as bonding.

Although the rubber sheet of the above specific configuration has the projections on the one surface, the other surface of the rubber sheet is free of particular limitaitons as to configuration. For example, the other surface may be completely flat or provided with the same projections as set forth above or with concentrically circular, spiral or radial grooves or ribs. Furthermore, recesses or projections each having a circular shape, a polygonal shape in plan view may be aligned regularly (e.g., concentrically circularly, spirally or radially) or at random.

Preferred configurations of the rubber sheet for turntable in accordance with the present invention will be explained by reference to the drawings.

BRIEF DESCRIPTION OF DRAWINGS

Referring to FIGS. 1 to 4, (1) is the body of a rubber sheet and (2) is a center shaft hole. One surface of the body (1) is provided with projections (3) aligned closely in contact with one another in concentrically circular arrays (cf. FIGS. 1, 3 and 4) (this arrangement of projections is called "Embodiment A" hereinafter). In the followings, such a concentrically circular array of projections (3) wherein the projections (3) are aligned closely will be referred to simply as "array (4) of projections". The number of the arrays (4) of projections is not particularly limited as long as the body (1) of the rubber sheet is held horizontally on the turntable and may be usually about 3 to about 10. The arrays (4) of projections may be substantially equally spaced along the radial direction of the body (1) of the rubber sheet, or as indicated in FIGS. 1 and 3, two or more arrays (4) may be disposed closely with one another into a block [for example, the two arrays (4b) and (4c), (4d) and (4e), and (4f) and (4g)], a plurarity of such blocks being disposed on the body (1). The arrays (4) of projections may be disposed on concentrically circularly aligned ribs (5) as shown in FIG. 3.

Although in Embodiment A the projections (3) in respective arrays (4) are usually flush at their tops, they should not be limited thereto. For example, when the surface bearing the projections (3) is to be in contact with the disk record, there is given an embodiment where the projections (3) are highest in the most inner array (4a) (the array is provided just outside the label section of the disc record) and lower gradually in the order of the arrays (4b), (4c), (4d), (4e), (4f) and (4g) so that the disc record is substantially held by means of the most inner array (4a) of projections and in no direct contact with the remaining arrays (4b), (4c), (4d), (4e), (4f) and (4g) of projections other than the array (4a). In this embodiment, the disc record is maintained under non-contacting relationship with the rubber sheet on its periphery when the disk record is stationary. However, when a cartridge is in operating position for playback of the disc record, the disk record comes into contact with the rubber sheet due to the weight of the cartridge so that the contact area with the rubber sheet is small. This insures a further improvement in isolation of external vibrations.

Figure 5:
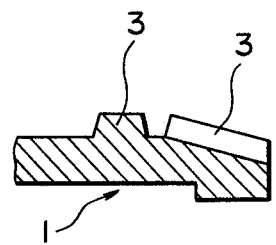
FIG. 5 is a vertical cross-sectional view showing an example of the shape of the edge portion of the rubber sheet for turntable in accordance with the present invention (i.e. a vertical cross-sectional view taken on the line (X)—(X) in FIG. 1).

The most outer array (4g) is usually disposed on an edge portion of the body (1) of the rubber sheet. It is preferable that, as illustrated in a vertical cross-sectional view of FIG. 5 (corresponding to an enlarged cross-sectional view taken on the line (X)—(X) in FIG. 1), the edge portion of the body (1) is outwardly inclined and the projections of the most outer array (4g) are disposed on this inclined edge portion. According to this embodiment, the tension resistance of the rubber sheet is reduced in the edge portion of the body (1) due to its thin thickness and the tight contact of the rubber sheet with the turntable is further improved.

Figure 1:
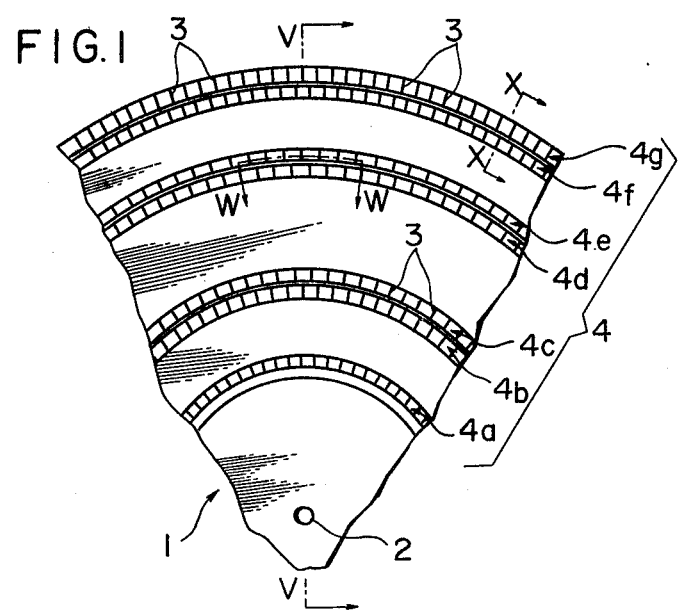
FIGS. 1 and 2 are, respectively, partial plan views of respective surfaces of a rubber sheet for turntable in accordance with an embodiment of the present invention.
Figure 4:
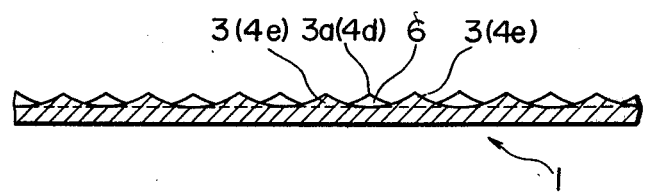
FIG. 4 is an enlarged cross-sectional view taken on the line (W)—(W) in FIG. 1.

In Embodiment A, the projections (3) may take the various shapes as described previously. Preferable shape is one where the head of the projection (3) is ridge-shaped. FIG. 4 depicts an example of such projections (3) which are of mountain profile with a downwardly expanding skirt. For the projections (3) with the ridge-shaped heads, it is preferable that the ridges (3a) thereof extend along the radial direction of the body (1) of the rubber sheet as shown in FIG. 1. In that case, with respect to two adjacent arrays [e.g., (4d) and (4e)], the projections (3) in the array (4d) may overlap with those in the other array (4e) along the radial direction of the body (1) of the rubber sheet. However, it is desirable that the ridges (3a) of the projections (3) in the array (4d) are located in agreement with valleys (6) between two adjacent projections (3) in the other array (4e) to avoid such overlapping relationship as seen from FIG. 4. According to this construction, the above-mentioned breathing behavior in a layer of air confined between the rubber sheet and the turntable or the disc record is effected more favorably, thus shielding off the external vibrations more sufficiently.

Figure 6:
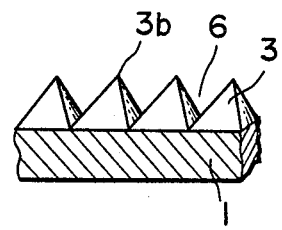
FIG. 6 is a partial perspective view of an example of an array of projections.
Figure 7:
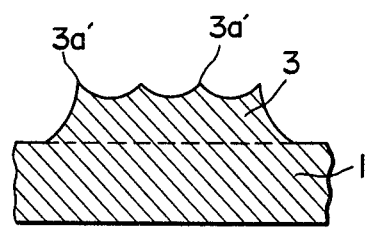
FIGS. 7 and 8 are vertical cross-sectional views showing an example of a projection with recesses.
Figure 8:
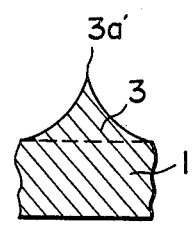

Another preferred shape of the projection (3) in Embodiment A is one where the head of the projection (3) is pointed. A partial perspective view of FIG. 6 [wherein the concentrically circular array (4) of projections is re-aligned in a straight line] depicts an example of such a shape of the projections (3). The projection (3) shown in FIG. 6 is a quandrangular pyramid. In the case of the projections (3) with the pointed heads, with respect to the projections (3) of two adjacent arrays [e.g., (4d) and (4e)], the projections (3) in the array (4d) may overlap with those in the other array (4e) along the radial direction of the body (1) of the rubber sheet but the pointed heads (3d) of the projections (3) in the array (4d) are preferably located in agreement with the valley (6) between two adjacent projections (3) in the other array (4e) along the radial direction of the body (1) of the rubber sheet to avoid such overlapping relationship, in the same manner as in the case of the projections (3) with the ridge-shaped heads. Each of the foregoing projections (3) has a single summit (3b) but may have two or more summits (3a') which may be formed by providing the ridge of the above-mentioned projection (3) having the ridge-shaped head with recesses as shown in FIGS. 7 and 8. FIG. 7 is a vertical cross-sectional view showing one of the projections (3) with the ridge-shaped head along the radial direction of the body (1) of the rubber sheet and FIG. 8 is a vertical cross-sectional view along the circumferential direction.

Figure 9:
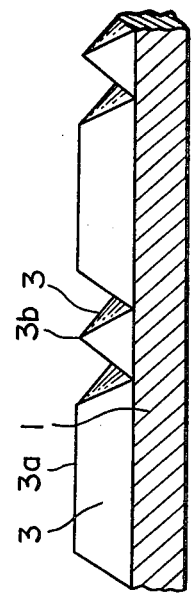
FIG. 9 is a partial perspective view of an example of an array where projections of different shapes are used in combination.

Furthermore, in Embodiment A, the projections (3) with the ridge-shaped heads and those with the pointed heads may be used in combination or these projections (3) may be used in combination with projections (3) of other different shapes in the particular array (4). An example of such combination is illustrated in a perspective view of FIG. 9 [but a perspective view wherein the concentrically circular array (4) of projections is re-aligned in a straight line]. In FIG. 9, the projections (3) with the pointed heads and the projections (3) with the ridge-shaped heads [but the latter is different from that in FIG. 4 in that the ridges (3a) are aligned along the circumferential direction of the body (1) of the rubber sheet] are aligned alternatively with each other.

Figure 2:
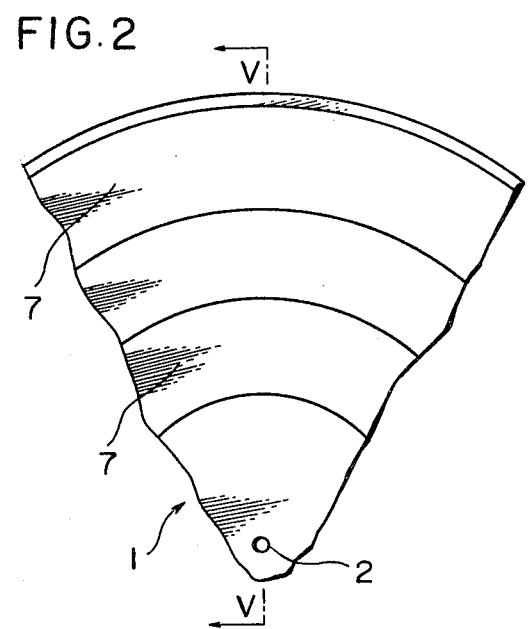
Figure 3:
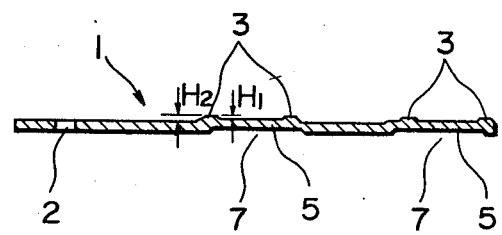
FIG. 3 is a vertical cross-sectional view taken on the line (V)—(V) in FIGS. 1 and 2.

As illustrated in FIGS. 2 and 3, it is desirable that the opposite surface of the rubber sheet provided with the projections (3) in accordance with Embodiment A is provided with concentrically circular grooves (7) in position to correspond to the respective arrays (4) of projections so that the rubber sheet is substantially uniform in thickness as a whole. In that case, each of the grooves (7) may be formed in correspondence with one of the individual arrays (4) of the projections or in correspondence with a plurality of adjacent arrays (4) of projections as shown in FIG. 3 [for example, one of the grooves (7) is provided for each of the ribs (5)]. With such a configuration, the weight of the rubber sheet is reduced and a layer of air is confined in the grooves (7), thus providing an improvement in vibration absorption and tone quality. In the case of the rubber sheet having the arrays (4) of projections on the one surface and the grooves (7) on the opposite surface, the tone quality of reproduced sounds differs delicately depending on which surface of the rubber sheet is to be in contact with the turntable (or the disc record). Therefore it is provided an advantage that proper selection of the surface of the rubber sheet to be in contact with the turntable (or the disc record) results in providing agreeable reproduced sounds.

The turntable is usually provided with openings in the intermediate portion between the center shaft and the periphery thereof. It is thus favorable that, when the surface provided with the grooves (7) is to be in contact with the turntable, the most inner groove (7) be kept away from the openings and a layer of air be confined between at least the most inner groove (7) and the turntable.

Figure 10:
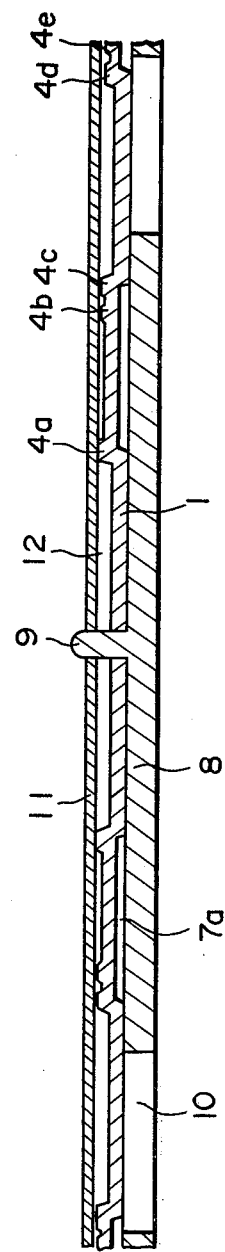
FIG. 10 is a partial, vertical cross-sectional view showing a situation where the rubber sheet for turntable in accordance with the present invention is mounted on a turntable and a disc record is mounted on the rubber sheet.

In the case where the surface provided with the arrays (4) of projections is in contact with the disc record and the other surface provided with the grooves (7) in contact with the turntable in accordance with the present invention, the preferred configuration of the rubber sheet is that wherein the projections (3) are highest in the most inner array (4a) and lower gradually in the order of the arrays (4b), (4c), (4d), (4e), (4f) and (4g) and at least the most inner groove (7) is kept away from the openings of the turntable. FIG. 10 depicts a situation where a rubber sheet of such a configuration is mounted on the turntable and the disc record is rested on the rubber sheet. In FIG. 10, (8) is the turntable, (9) is the center shaft, (10) is the openings of the turntable and (11) is the disc record. In the situation shown in FIG. 10, the rubber sheet is in tight contact at its central portion (corresponding to the label region of the disc record) with the turntable (8). Over the central portion of the rubber sheet which is in tight contact with the turntable, there is involved a layer of air (12) between the disc record (11) and the most inner array (4a) of the projections on the rubber sheet. The air in the layer (12) passes inwardly and outwardly through the gaps between the adjacent projections in the array (4a) to thereby perform the breathing behavior as stated above during reproduction of the disc record. On the other hand, the most inner groove (7a) of the rubber sheet is kept away from the openings (10) of the turntable (8) so that a layer of air is hermetically sealed within the groove (7a). This combination of the central portion of the rubber sheet which is in tight contact with the turntable, the layer (12) of air performing the breathing behavior and the layer of the hermetically sealed air in the groove (7) exhibits particularly excellent vibration-damping effect and tone quality improving effect.

Figure 11:
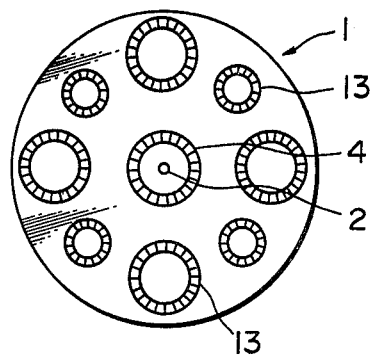
FIGS. 11 to 13 are, respectively, plan views of the rubber sheet for turntable in accordance with the present invention, wherein a plurality of insular arrays of projections are provided.
Figure 12:
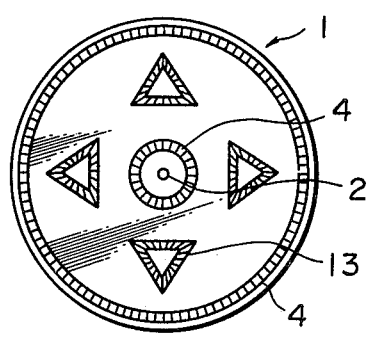
Figure 13:
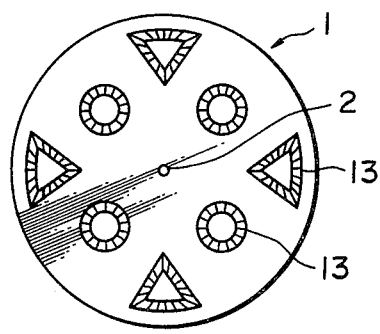

While in the foregoing there is explained a configuration of the rubber sheet wherein air is confined between the rubber sheet and the disc record or the turntable by the concentrically circular arrays (4) of the closely aligned projections, the arrangement of the projections effective to confine air is not limited thereto. For example, as illustrated in plan views of FIGS. 11 to 13, there are arrangements wherein a plurality of circular (including elliptic) arrays of closely aligned projections (3), a plurality of polygonal (including a triangle, a quadrangle and so on) arrays of closely aligned projections (3), a plurality of fan-shaped arrays of closely aligned projections (3), etc. (those will be referred to as "insular arrays (13) or projections" hereinafter) are disposed outside the label section of the disk record. According to this embodiment, air is confined by means of the individual insular arrays (13) or projections to provide breathing behavior. The insular arrays (13) of projections may not be of the same dimention and for example smaller insular arrays (13) may be interposed among greater insular arrays (13) as shown in FIG. 11. Moreover, the differently shaped insular arrays (13) of projections may be used together as shown in FIG. 13. In this embodiment, the concentrically circular array (4) of projections may be disposed at the central portion or peripheral portion of the body (1) of the rubber sheet as shown in FIGS. 11 and 12.

Figure 14:
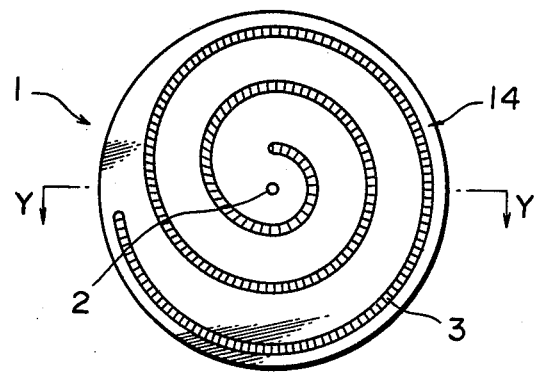
FIGS. 14 and 15 are, respectively, plan views of respective surfaces of a rubber sheet for turntable in accordance with another embodiment of the present invention.
Figure 15:
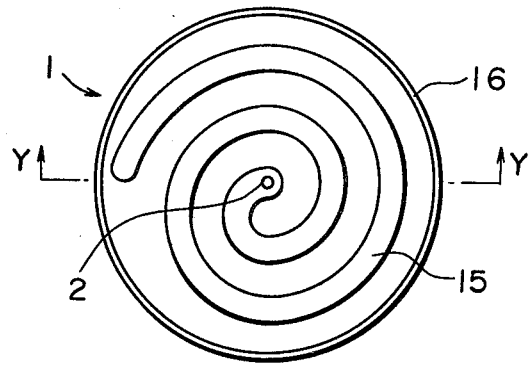
Figure 16:
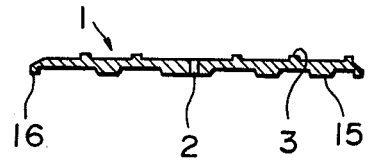
FIG. 16 is a vertical cross-sectional view taken on the line (Y)—(Y) in FIGS. 14 and 15.

FIG. 14 is a plan view of one surface of the rubber sheet for turntable in accordance with another embodiment of the present invention, FIG. 15 is a plan view of the other surface of the rubber sheet and FIG. 16 is a vertical cross-sectional view taken on the line (Y)—(Y) in FIGS. 14 and 15. In the one surface of the body (1) of the rubber sheet there are provided projections (3) aligned closely with one another in a spiral array (see FIG. 14) (this arrangement of projections is referred to as "Embodiment B" hereinafter). In the following, such a spiral array of the closely aligned projections (3) will be simply named "array (14) of projections".

In Embodiment B, the respective projections (3) in the array (14) may be all flush at their tops or lower gradually in a direction toward the periphery of the rubber sheet for the same reason as in Embodiment A. Each projection (3) may also take the various shapes as described above but a projection having a ridge-shaped head or a pointed head is preferable as in Embodiment A. In the case of the projections having the ridge-shaped head, it is preferable that the ridges be aligned substantially along the radial direction of the body (1) of the rubber sheet as shown in FIG. 14. The projections with the ridge-shaped head may be provided with recesses to form two or more summits as shown in FIGS.

7 and 8. Furthermore, in the array (14) of projections, the projections with the ridge-shaped head and the projections with the pointed head may be used in combination and further those projections may be used in combination with projections of other shapes as shown in FIG. 9. In Embodiment B, preferably the edge portion of the body (1) of the rubber sheet is outwardly inclined in a way similar to Embodiment A.

With regard to the other surface of the rubber sheet provided with the projections (3) according to Embodiment B, it is desirable that a portion thereof corresponding to the array (14) of projections is made concave as shown in FIGS. 15 and 16 [as a result, a spiral convex rib (15) is formed in the remaining portion] to thereby make the thickness of the rubber sheet substantially uniform as a whole. The edge portion of the other surface is usually provided with a flange portion (16) to confine air.

Figure 17:
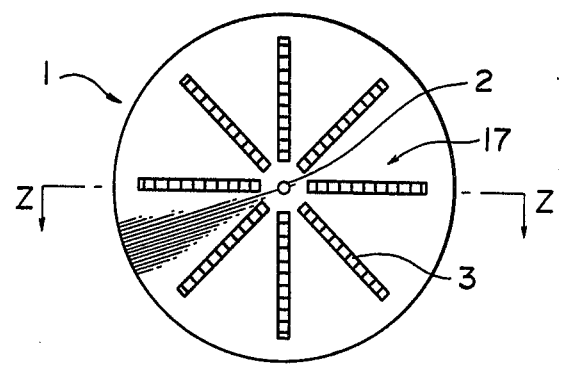
FIGS. 17 and 18 are, respectively, plan views of respective surfaces of a rubber sheet in accordance with further another embodiment of the present invention.
Figure 18:
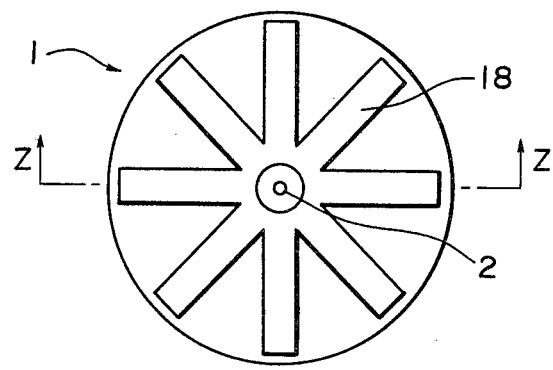
Figure 19:
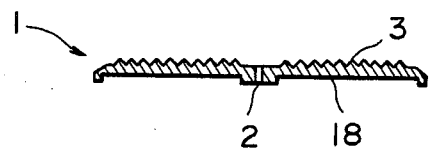
FIG. 19 is a vertical cross-sectional view taken on the line (Z)—(Z) in FIGS. 17 and 18.

FIG. 17 is a plan view of one surface of the rubber sheet for turntable in accordance with further another embodiment of the present invention, FIG. 18 is a plan view of the other surface of the rubber sheet and FIG. 19 is a vertical cross-sectional view on the line (Z)—(Z) in FIGS. 17 and 18. On the one surface of the body (1) of the rubber sheet there are provided projections (3) aligned closely with one another in radial arrays (see FIG. 17) (this arrangement of the projections is referred to as "Embodiment C" hereinafter). In the following, the radial arrays of the closely aligned projections will be simply named "array (17) of projections".

In Embodiment C, the respective projections (3) in the arrays (17) may be all flush at their tops or lower gradually in a direction toward the periphery of the rubber sheet for the same reason as in Embodiment A. Each projection (3) may take the various shapes as described above, but a projection (3) having a ridge-shaped head or a pointed head is preferable as in Embodiment A. The projections with the ridge-shaped head may be provided with recesses to form two or more summits as shown in FIGS. 7 and 8. In the array (17) of projections, the projections with the ridge-shaped head and the projections with the pointed head may be used in combination and further these projections may be used in combination with projections of other shapes as shown in FIG. 9. In Embodiment C, preferably the edge portion of the body (1) of the rubber sheet is outwardly inclined as in Embodiment A.

With regard to the other surface of the rubber sheet provided with the projections (3) according to Embodiment C, it is also desirable that portions thereof corresponding to the arrays (17) of projections are made radially concave to form radial concave parts (18) in order to make the thickness of the rubber sheet substantially uniform as a whole, as shown in FIGS. 18 and 19.

In Embodiments A to C, the projections (3) are aligned closely with one another but the arrangement of the projections (3) is not necessarily limited thereto. They may be aligned at any appropriate interval.

The rubber sheet for turntable in accordance with the present invention is free of any particular limitation as to thickness. However, the rubber sheet usually has a maximum thickness in the order of 2 to 8 mm., a minimum thickness in the order of 0.1 to 3 mm. and an average thickness in the order of 0.1 to 6 mm., more particularly 0.5 to 2 mm.

The rubber sheet of the present invention may be made in a conventional manner. For example, the above specified rubber composition is directly press-cured in a mold of a given configuration. As an alternative, an uncured composition in the form of sheet is prepared by calender molding or extrusion molding and then subjected to press curing. Injection molding is also available. It is desirable that the projections (3) are formed in the mold at one time, but they may be shaped by cutting after curing. Furthermore, the projections (3) may be made independently of the body (1) of the rubber sheet and bonded to the body (1) of the rubber sheet with an appropriate adhesive or the like.

BEST MODE FOR CARRYING OUT THE INVENTION

The rubber sheet for turntable in accordance with the present invention will be explained by referring to Examples and Comparative Examples.

EXAMPLES 1 TO 4

Using the rubber compositions as shown in Table 1, rubber sheets for turntable were manufactured.

TABLE 1

| | Rubber Composition (in parts) | | | |
| --- | --- | --- | --- | --- |
| | Examples | | | |
| | 1 | 2 | 3 | 4 |
| Norsorex 150 NA (Note 1) | 250 | 250 | 250 | 250 |
| White factice S (Note 2) | 225 | 20 | 260 | 120 |
| Sunthene 255 (Note 3) | 410 | 200 | 690 | 280 |
| Dioctyl phthalate | 45 | 10 | — | — |
| FEF carbon | 50 | 50 | 25 | 50 |
| Zinc oxide | 5 | 5 | 5 | 5 |
| Stearic acid | 1 | 1 | 1 | 1 |
| Sumilizer MDP (Note 4) | 2 | 2 | 2 | 2 |
| Sulfur | 2.5 | 2 | 2 | 2 |
| Sunceller CZ (Note 5) | 10 | 8 | 12 | 9 |

(Note 1): Polynorbornene (Norsorex (registered trademark), average molecular weight of not less than $2 \times 10^6$) extended with 150 parts of naphthenic oil on the basis of 100 parts of polynorbornene, sold by Nippon Zeon Co., Ltd.
(Note 2): White factice made by Temma Sabu Kako Kabushiki Kaisha
(Note 3): Naphthenic oil made by Japan Sunoil Co., Ltd.
(Note 4): 2,2'-Methylene-bis(4-methyl-6-tert.-butylphenol) made by Sumitomo Chemical Co., Ltd.
(Note 5): N—cyclohexyl-2-benzothiazyl sulfenamide made by Sanshin Kagaku Kabushiki Kaisha.

The rubber component was first scoured at about 60° C. and kneaded with additional components by means of a Banbury mixer and further a roller and sheeted out to give a sheet of about 2 mm. to about 3 mm. thick. A disc was cut out from the sheet and cured by a press machine with a given mold under a pressure of 150 kg./cm.$^2$ and at a temperature of 155° C. for 20 min.

Thus there were obtained rubber sheets for turntable having the configuration as shown in FIGS. 1 to 4 and 10; a diameter of 292 mm; a maximum thickness of 3.7 mm; a minimum thickness of 1.9 mm; a height of the projections (3) in the most inner array (4a) of 0.5 mm. [the height ($H_1$) in FIG. 3] or 1.5 mm. [the height ($H_2$) in FIG. 3]; a length of the ridges of the projections (3) of about 3 mm. to about 6.5 mm; a spacing between adjacent projections (3) of about 5 mm. to about 6 mm; a depth of the grooves (7) of 1 mm; and a width of the grooves (7) (in the radial direction) of about 30 mm. (the individual projections (3) were made gradually lower in height toward the periphery of the rubber sheet).

With respect to the obtained rubber sheets, various physical properties were measured. The results are shown in Table 2. Measurements of impact resilience, tensile strength and elongation indicated in Table 2 were conducted according to JIS K 6301-1969.

TABLE 2

| Physical constants | Examples | | | |
|---|---|---|---|---|
| | 1 | 2 | 3 | 4 |
| A hardness (degree) | 4 | 5 | 7 | 9 |
| Impact resilience (%) | 68 | 60 | 72 | 74 |
| Tensile strength (kg./cm.$^2$) | 8 | 21 | 19 | 10 |
| Elongation (%) | 398 | 575 | 367 | 281 |
| Specific gravity | 0.977 | 0.982 | 1.003 | 0.987 |

Total area of the ridges of the projections (3) (852 in total number) in each rubber sheet of Examples 1 to 4 occupied about 1.45% of the entire area of the one surface of the rubber sheet (assuming that the width of the ridges was 0.25 mm.). When a glass sheet having the same dimension as that of the rubber sheet and a thickness of 2 mm. (weight: about 300 g.) was mounted on the one surface of the rubber sheet bearing the projections (3), the glass sheet was substantially in contact with the rubber sheet only at the ridges of the projections (3) in the most inner array (4a). In that case, the ratio of the contact area to the entire area of the one surface of the rubber sheet was about 0.1%. The preferred configuration of the rubber sheet for turntable in accordance with the present invention is characterized in that the contact area is small in such a way.

Furthermore, the following tests were carried out on the rubber sheets of Examples 1 to 4. For comparison, the same tests were also carried out on four sorts of rubber sheets attached to players commercially available on the market. The rubber sheets used herein are summarized in Table 3.

TABLE 3

Figure 20A:
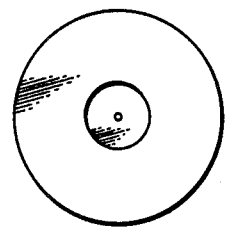
FIGS. 20a and 20b, 21a and 21b, 22a and 22b and 23a and 23b are top views and cross-sectional views of the conventional rubber sheets for turntable, respectively.
Figure 21A:
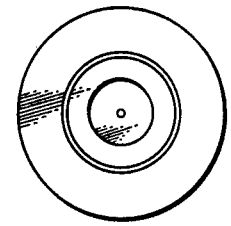
Figure 20B:
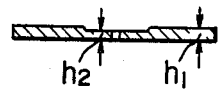
Figure 21B:
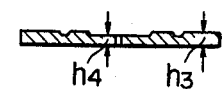
Figure 22A:
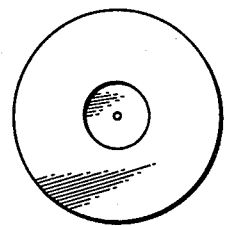
Figure 23A:
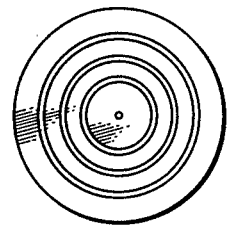
Figure 22B:
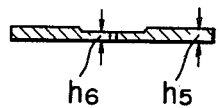
Figure 23B:
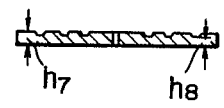

| Comparative Examples | 1 | 2 | 3 | 4 |
|---|---|---|---|---|
| Material | Butyl rubber | SBR/NR (Note 1) | Styrene-butadiene rubber | Butyl rubber (Note 2) |
| A hardness (degree) | 24 | 50 | 57 | 36 |
| Impact resilience (%) | 19 | — | 33 | — |
| Specific gravity | 1.223 | 1.356 | 1.431 | 1.642 |
| Halogenation | No | Yes | Yes | Yes |
| Configuration (Note 3) | FIG. 20a FIG. 20b | FIG. 21a FIG. 21b | FIG. 22a FIG. 22b | FIG. 23a FIG. 23b |

(Note 1): Mixture of styrene-butadiene rubber and natural rubber
(Note 2): The body made of butyl rubber is covered with a mixture of natural rubber and styrene-butadiene rubber.
(Note 3): FIGS. 20a and 20b, 21a and 21b, 22a and 22b, and 23a and 23b are top and cross-sectional views of the rubber sheets of Comparative Examples 1 to 4, respectively. In the drawings, thicknesses ($h_1$), ($h_2$), ($h_3$), ($h_4$), ($h_5$), ($h_6$), ($h_7$) and ($h_8$) of the rubber sheets are as follows: ($h_1$): 4.2 mm. ($h_2$): 3.5 mm. ($h_3$): 5 mm. ($h_4$): 4 mm. ($h_5$): 3.5 mm. ($h_6$): 2.5 mm. ($h_7$): 5 mm. ($h_8$): 4.5 mm.

The summaries of configurations were as follows:

Comparative Example 1

Top surface: There is provided a circular recess of 0.7 mm. deep at its center.
Bottom surface: flat Comparative Example 2

Top surface: There are provided a circular recess of 1.0 mm. deep at its center and a concentrically circular groove of 1.0 mm. deep.
Bottom surface: flat Comparative Example 3

Top surface: There is provided a circular recess of 1.0 mm. deep at its center.
Bottom surface: flat Comparative Example 4

Top surface: There are provided three concentrically circular grooves of 0.5 mm. deep.
Bottom surface: flat It is noted that the bottom surfaces of the rubber sheets of Comparative Examples 1 to 4 are all flat and the flat surfaces are to be in contact with the turntable. In the following tests, therefore, the rubber sheets of Comparative Examples 1 to 4 were mounted so that their flat bottom surface was in contact with the turntable.

(1) Tone quality test
(i) Play-back equipment
Pre-main amplifier: AU-D907 (made by Sansui Electric Co., Ltd.)
Player: DP-40F (made by Nippon Columbia Co., Ltd.)
Cartridge: V-15 type 3 (made by Shure Brothers, Inc.)
Loudspeaker: DS-401 (made by Mitsubishi Electric Corporation)
(ii) Location
About 40-tatami mat room (equipped with an air conditioner and a ventilator)
Floor: Vinyl-tiled (with mortared underlying layer)
Ceiling: Flat noninflammable material (no sound-absorption opening)
Inner walls: Plywood
(iii) Test method
A panel of 4 trained listeners A, B, C and D was instructed to hear the following records and score them on the following parameters. The rubber sheets of Examples 1 to 4 were set on the turntable so that the surface illustrated in FIG. 1 [the surface provided with the projections (3)] was in contact with the record.

(α) Female vocal
Title of record: Valses, Canciones Y Tangos (Nippon Phonogram Co., Ltd.)
Singer: Ginamaria Hidalgo
Accompaniment: Hugo Videla (guitar) and others
Program: Te Pido Que Lo Pienses
Parameters:
(a) if reproduced sounds are near human sounds
(b) if the treble region of soprano is not distorted
(c) if accompanying guitar sounds are not stronger than vocal sounds
(d) if the impressions of presence are rich (β) Concerto
Title of record: "Le Quattro Stagioni" #8 by Vivaldi (Nippon Phonogram Co., Ltd.)
Performer: Roberto Michelucci (violin) and I Musici
Program: Concerto No. 1, E Major RV 269 "Spring"
Parameters:
(a) if sounds of chords are vivid
(b) if the treble region is not distorted
(c) if the bass region is well reproduced
(d) if the impressions of presence are rich (γ) Flamenco guitar
Title of record: Manolo Sanlúcar in Japan (RVC Corporation)
Performer: Manolo Sanlúcar (guitar), Isidro (guitar) and José Miguel (piano)
Program: Callejón del Carmen Parameters:
 (a) if sounds of chords are well reproduced
 (b) if the treble region is not distorted
 (c) if beats of a guitar are well reproduced
 (d) if the impressions of presence are rich The scores as to the above parameters were determined according to the following five-point system.

5 points: Exceptionally good
4 points: Fairly good
3 points: Good
2 points: Ordinary
1 point: Poor The sum of the points as to each of the parameters evaluated by each of the listeners multiplied by five was regarded as overall evaluation by each of the listeners (if all of the parameters are evaluated as 5 points, overall evaluation would be full marks (100 points). Also, the average value of overall evaluations by the four listeners was computed.

The results thereof are shown in Tables 4 to 9.

TABLE 4

| Parameters | (Female vocal) | | | | | | | | | | | | | | | |
|---|---|---|---|---|---|---|---|---|---|---|---|---|---|---|---|---|
| | Example 1 | | | | Example 2 | | | | Example 3 | | | | Example 4 | | | |
| | A | B | C | D | A | B | C | D | A | B | C | D | A | B | C | D |
| Nearness to human voices | 5 | 5 | 5 | 5 | 5 | 5 | 5 | 5 | 5 | 5 | 5 | 5 | 5 | 5 | 5 | 5 |
| Distortion of treble | 5 | 5 | 5 | 5 | 5 | 5 | 5 | 5 | 5 | 5 | 3 | 5 | 3 | 5 | 3 | 5 |
| Accompanying guitar | 5 | 5 | 5 | 5 | 5 | 5 | 3 | 5 | 5 | 5 | 5 | 3 | 5 | 3 | 5 | 5 |
| Presence | 5 | 5 | 5 | 5 | 5 | 5 | 5 | 5 | 5 | 3 | 5 | 5 | 5 | 3 | 5 | 5 |
| Overall evaluation | 100 | 100 | 100 | 100 | 100 | 100 | 90 | 100 | 100 | 90 | 90 | 90 | 90 | 80 | 90 | 100 |
| Average | 100 | | | | 98 | | | | 92 | | | | 90 | | | |

TABLE 5

| Parameters | (Female vocal) | | | | | | | | | | | | | | | |
|---|---|---|---|---|---|---|---|---|---|---|---|---|---|---|---|---|
| | Comparative Example 1 | | | | Comparative Example 2 | | | | Comparative Example 3 | | | | Comparative Example 4 | | | |
| | A | B | C | D | A | B | C | D | A | B | C | D | A | B | C | D |
| Nearness to human voices | 3 | 3 | 5 | 3 | 1 | 2 | 2 | 2 | 1 | 2 | 2 | 2 | 1 | 2 | 2 | 2 |
| Distortion of treble | 1 | 5 | 3 | 3 | 1 | 2 | 2 | 2 | 1 | 1 | 1 | 1 | 1 | 2 | 2 | 2 |
| Accompanying guitar | 2 | 3 | 3 | 2 | 2 | 2 | 2 | 2 | 1 | 2 | 2 | 2 | 1 | 2 | 2 | 2 |
| Presence | 3 | 3 | 3 | 3 | 2 | 2 | 2 | 2 | 1 | 2 | 2 | 2 | 2 | 2 | 2 | 2 |
| Overall evaluation | 45 | 70 | 70 | 55 | 30 | 40 | 40 | 40 | 20 | 35 | 35 | 35 | 25 | 40 | 40 | 40 |
| Average | 60 | | | | 38 | | | | 31 | | | | 36 | | | |

TABLE 6

| Parameters | (Concerto) | | | | | | | | | | | | | | | |
|---|---|---|---|---|---|---|---|---|---|---|---|---|---|---|---|---|
| | Example 1 | | | | Example 2 | | | | Example 3 | | | | Example 4 | | | |
| | A | B | C | D | A | B | C | D | A | B | C | D | A | B | C | D |
| Sounds of chords | 5 | 5 | 5 | 5 | 5 | 5 | 5 | 5 | 3 | 5 | 5 | 3 | 5 | 3 | 5 | 5 |
| Distortion of treble | 5 | 5 | 5 | 5 | 3 | 5 | 3 | 5 | 5 | 5 | 5 | 3 | 5 | 3 | 3 |
| Bass | 5 | 5 | 5 | 5 | 5 | 5 | 5 | 5 | 5 | 3 | 3 | 5 | 5 | 5 | 5 | 5 |
| Presence | 5 | 5 | 5 | 5 | 5 | 5 | 5 | 5 | 5 | 5 | 5 | 3 | 5 | 5 | 5 |
| Overall evaluation | 100 | 100 | 100 | 100 | 90 | 100 | 90 | 100 | 90 | 90 | 90 | 90 | 80 | 90 | 90 | 90 |
| Average | 100 | | | | 95 | | | | 90 | | | | 88 | | | |

TABLE 7

| Parameters | (Concerto) | | | | | | | | | | | | | | | |
|---|---|---|---|---|---|---|---|---|---|---|---|---|---|---|---|---|
| | Comparative Example 1 | | | | Comparative Example 2 | | | | Comparative Example 3 | | | | Comparative Example 4 | | | |
| | A | B | C | D | A | B | C | D | A | B | C | D | A | B | C | D |
| Sounds of chords | 3 | 3 | 3 | 3 | 3 | 2 | 3 | 3 | 2 | 2 | 2 | 2 | 3 | 2 | 3 | 3 |
| Distortion of treble | 5 | 5 | 3 | 5 | 2 | 2 | 3 | 2 | 2 | 3 | 3 | 2 | 2 | 2 | 1 | 2 |
| Bass | 2 | 3 | 3 | 3 | 2 | 3 | 3 | 3 | 2 | 3 | 2 | 2 | 2 | 3 | 3 | 2 |
| Presence | 3 | 5 | 3 | 3 | 2 | 1 | 2 | 2 | 2 | 3 | 2 | 2 | 3 | 2 | 1 | 2 |
| Overall evaluation | 65 | 80 | 60 | 70 | 45 | 40 | 55 | 50 | 40 | 55 | 45 | 40 | 50 | 45 | 40 | 45 |

TABLE 7-continued

|  | (Concerto) | | | | | | | | | | | | | | | |
|---|---|---|---|---|---|---|---|---|---|---|---|---|---|---|---|---|
|  | Comparative Example 1 | | | | Comparative Example 2 | | | | Comparative Example 3 | | | | Comparative Example 4 | | | |
| Parameters | A | B | C | D | A | B | C | D | A | B | C | D | A | B | C | D |
| Average | 69 | | | | 47 | | | | 45 | | | | 45 | | | |

TABLE 8

|  | (Flamenco guitar) | | | | | | | | | | | | | | | |
|---|---|---|---|---|---|---|---|---|---|---|---|---|---|---|---|---|
|  | Example 1 | | | | Example 2 | | | | Example 3 | | | | Example 4 | | | |
| Parameters | A | B | C | D | A | B | C | D | A | B | C | D | A | B | C | D |
| Sounds of chords | 5 | 5 | 5 | 5 | 5 | 3 | 5 | 5 | 5 | 5 | 3 | 3 | 5 | 3 | 5 | 3 |
| Distortion of treble | 5 | 5 | 5 | 5 | 5 | 5 | 5 | 5 | 5 | 5 | 5 | 5 | 5 | 5 | 5 | 5 |
| Beats of guitar | 5 | 5 | 5 | 5 | 5 | 3 | 5 | 5 | 3 | 3 | 5 | 5 | 3 | 3 | 5 | 5 |
| Presence | 5 | 5 | 5 | 5 | 5 | 5 | 5 | 5 | 5 | 5 | 3 | 5 | 5 | 5 | 3 | 5 |
| Overall evaluation | 100 | 100 | 100 | 100 | 100 | 80 | 100 | 100 | 90 | 90 | 80 | 90 | 90 | 80 | 90 | 90 |
| Average | 100 | | | | 95 | | | | 88 | | | | 88 | | | |

TABLE 9

|  | (Flamenco guitar) | | | | | | | | | | | | | | | |
|---|---|---|---|---|---|---|---|---|---|---|---|---|---|---|---|---|
|  | Comparative Example 1 | | | | Comparative Example 2 | | | | Comparative Example 3 | | | | Comparative Example 4 | | | |
| Parameters | A | B | C | D | A | B | C | D | A | B | C | D | A | B | C | D |
| Sounds of chords | 3 | 3 | 3 | 5 | 2 | 3 | 2 | 2 | 2 | 3 | 2 | 2 | 2 | 2 | 2 | 2 |
| Distortion of treble | 5 | 5 | 3 | 5 | 2 | 2 | 1 | 2 | 3 | 2 | 2 | 3 | 2 | 2 | 3 | 3 |
| Beats of guitar | 2 | 3 | 3 | 3 | 3 | 2 | 3 | 2 | 2 | 3 | 2 | 2 | 2 | 2 | 2 | 2 |
| Presence | 3 | 2 | 3 | 2 | 2 | 2 | 1 | 2 | 1 | 2 | 1 | 2 | 2 | 2 | 2 | 1 |
| Overall evaluation | 65 | 65 | 60 | 75 | 45 | 45 | 35 | 40 | 40 | 50 | 35 | 45 | 40 | 40 | 45 | 35 |
| Average | 66 | | | | 41 | | | | 42 | | | | 40 | | | |

(2) Howling test

Likewise the tone quality test, the listeners A, B, C and D were instructed to hear the three sorts of records mentioned above and determine the presence or absence of howling on the basis of the following definition. The pre-main amplifier was employed with both treble and bass being located at "flat", while volume pointed toward 11 o'clock.

Definition of howling: Howling means all that the tone quality of reproduced sounds is deteriorated due to external vibrations and the reproduction of source sounds (for example, human voices per se in the case of vocal) is adversely affected.

Howling was evaluated according to the 10-point system. "10 points" indicated that no howling was observed and source sounds were reproduced as they were. Decrease in points indicated increase in howling and 1 point indicates that howling was most severe and normal reproduced sounds were not absolutely obtained. The results are shown in Table 10, wherein "obverse" and "reverse" with respect to the rubber sheets of Examples 1 to 4 means the following matters:

Obverse: The surface as illustrated in FIG. 1 [i.e., the surface provided with the projections (3) thereon] is regarded as a top surface (i.e., the surface being in contact with the disc record).

Reverse: The surface as illustrated in FIG. 2 [i.e., The surface provided with the grooves (7)] is regarded as a top surface.

Points in Table 10 show the average value of the points evaluated by the four listeners (fractions were rounded off).

TABLE 10

| Record | Ex. 1 | | Ex. 2 | | Ex. 3 | | Ex. 4 | | Com. Ex. 1 | Com. Ex. 2 | Com. Ex. 3 | Com. Ex. 4 |
|---|---|---|---|---|---|---|---|---|---|---|---|---|
|  | O | R | O | R | O | R | O | R | | | | |
| Female vocal | 10 | 10 | 9 | 10 | 9 | 9 | 9 | 9 | 5 | 4 | 4 | 4 |
| Concerto | 9 | 9 | 8 | 9 | 8 | 8 | 8 | 9 | 4 | 4 | 3 | 4 |
| Flamenco guitar | 9 | 9 | 8 | 8 | 8 | 8 | 8 | 8 | 4 | 4 | 3 | 4 |

O: Obverse
R: Reverse

In the above tone quality test and howling test, the rubber sheets of the present invention (Examples 1 to 4) gave outstandingly excellent results in comparison with the conventional rubber sheets (Comparative Examples 1 to 4). It is believed that the specific physical properties and further the specific configuration of the rubber sheet of the present invention contributed to such results. That is, the rubber sheet of the present invention is featured by a superlow hardness, i.e. a hardness of from not more than 30°, preferably not more than 20° in A hardness to not less than 15°, preferably not less than 30° in F hardness and a high elasticity, i.e. an impact resilience of not less than 40%, preferably not less than 50%. The rubber sheet of the present invention possesses the specific characteristics of tightly contacting to the disc record or the turntable and preventing slip or resonance, as will be understood from the results of slip tests and lift tests discussed below, and further insuring decrease in the contact area and providing breathing behavior by use of the specific configuration with the projections. As a result of the combination of those excellent characteristics, the rubber sheet effectively prevents the tone quality of reproduced sounds from deteriorating due to howling or external vibrations and permits reproducing source sounds as faithfully as they are. In the case of the conventional rubber sheets, on the other hand, the rubber sheet of Comparative Example 1 is low in hardness, i.e. 24° in A hardness but low in impact resilience, i.e. 19%, and the rubber sheets of Comparative Examples 2 to 4 are high in hardness. All conventional rubber sheets, therefore, neither meet the hardness and impact resilience defined in the present invention nor prevent sufficiently the tone quality of reproduced sounds from deteriorating due to howling or external vibrations.

(3) Slip test

After the rubber sheet was set on the turntable of a player (PL-380 made by Pioneer Electronic Corporation) together with a disc record and was rotated at a rate of 33⅓ r.p.m. with lowering a stylus on the disc record, the disk record was urged to stop by gripping lightly the both opposed radial edges of the disc record by both hands, to thereby allow the operator to observe the stopping movement of the turntable. It was regarded that the rubber sheet was "qualified" if the turntable came to a stop immediately after or within 1 second from interruption of rotating the record and was "disqualified" if it took more than 2 seconds for the turntable to come to a stop after interruption of rotating the record. The results thereof are shown in Table 11.

TABLE 11

| Rubber sheet | | Evaluation |
| --- | --- | --- |
| Example 1 | Obverse | Qualified |
| | Reverse | " |
| Example 2 | Obverse | " |
| | Reverse | " |
| Example 3 | Obverse | " |
| | Reverse | " |
| Example 4 | Obverse | " |
| | Reverse | " |
| Comparative Example 1 | | Disqualified |
| Comparative Example 2 | | " |
| Comparative Example 3 | | " |
| Comparative Example 4 | | " |

In the above test, the rubber sheets of Examples 1 to 4 were all qualified, whereas even the rubber sheet of Comparative Example 1 (subjected to no halogenation treatment) which apparently had the highest frictional resistance among the rubber sheets of Comparative Examples 1 to 4 was disqualified.

(4) Lift test

This test was conducted to evaluate the tight-contacting properties of rubber sheets.

The rubber sheet to be lifted [the rubber sheet of Comparative Example 3 (weight: 340 g.) was used] was placed on a desk after its center shaft opening was sealed with a cellophane tape, and a rubber sheet to be tested was superimposed thereon with the center shaft holes aligned. Then, with the test rubber sheet gripped by thumb and index finger at its center shaft opening so as to stop up the opening, the sheets as a unit were slid across the desk top beyond the edge of the desk into suspension to observe whether the rubber sheet to be lifted would fall off or not. Since the top surface of the rubber sheet of Comparative Example 3 to be lifted was already subjected to halogenation treatment, the above test was carried out to study the influence of the halogenation treatment, both in the case that the test rubber sheet was attached to the top surface of the rubber sheet of Comparative Example 3 to be lifted and in the case that the test rubber sheet was attached to the untreated bottom surface of the rubber sheet of Comparative Example 3. The rubber sheet of Example 1 and the rubber sheet of Comparative Example 1 (which was deemed as bearing the best tight-contacting properties out of Comparative Examples 1 to 4) were used as a rubber sheet to be tested. In the case of the rubber sheet of Example 1, the surface as shown in FIG. 2 was held in contact with the rubber sheet to be lifted and in the case of the rubber sheet of Comparative Example 1, the flat surface (bottom surface) was held in contact with the rubber sheet to be lifted.

As a result, while the rubber sheet of Example 1 attracted tightly the rubber sheet to be lifted as a sucker and lifted up it and thus the rubber sheet did not fall, the rubber sheet of Comparative Example 1 absolutely failed to attract the rubber sheet to be lifted and it fell.

The above test made clear that the rubber sheet of Example 1 was capable of lifting up the rubber sheet of Comparative Example 3 with 340 g. weight. Next, it was determined what weight in gm. the rubber sheet of Example 1 was capable of lifting up.

A plurality of the rubber sheets of Comparative Example 3 were stacked with one on the other and adhered by use of a cellophane tape. Then, the rubber sheet of Example 1 was mounted thereon and the lift test was carried out in the same manner as in the above test.

As a result, it was revealed that the rubber sheet of Example 1 was able to lift up a pile of 10 rubber sheets of Comparative Example 3 (weight: 3.4 kg.). When an attempt was made to lift up the pile of 10 rubber sheets of Comparative Example 3, a break was developed at a portion of the rubber sheet of Example 1 where was held by the operator and therefore the test could be conducted no longer.

As is clear from the results of the above slip and lift tests, the rubber sheet of the present invention possesses a high friction resistance and an excellent tight-contacting property and also possesses the function of a stabilizer. In case of employing the rubber sheet of the present invention, therefore, there is no need for such a stabilizer.

(5) Scratch test

This test was conducted on the rubber sheet of Example 1 and the rubber sheet of Comparative Example 3 (which was subjected to halogenation treatment).

A cartridge portion of a player (SF-135 made by Matsushita Electric Industrial Co., Ltd.) was provided with a weight and covered with a kraft paper so that a load of about 30 g. was applied to the rubber sheet on the turntable with a contact area of about 2 $cm^2$. The cartridge with the weight was located about 5 cm. inside the periphery of the rubber sheet and the turntable was rotated at a rate of 45 r.p.m. The turntable was braked to stop every one minute to observe if any scratch mark was made.

As a result, in the case of the rubber sheet of Example 1, faint marks were made after 30 minutes but those marks disappeared upon once rubbing with a finger without leaving any trace. On the other hand, in the case of the rubber sheet of Comparative Example 3, an infinite number of fine scratch marks, though not very conspicuous, were made after 3 minutes and those marks could not be removed by rubbing with a finger. Further, rubbing marks were severely made after 30 minutes and those marks could not be also removed by rubbing with a finger.

The conventional rubber sheets are mostly subjected to halogenation treatment to increase surface hardness in order to prevent the sheet surface from being marred as in the case of the rubber sheet of Comparative Example 3. As is evident from the foregoing results, even though subjected to no halogenation treatment, the rubber sheet of the present invention is less marred than the conventional rubber sheets subjected to halogenation treatment. In addition, in the case of a rubber sheet of the present invention, scratch marks, as far as they are faint, can be easily cleared by rubbing with a finger.

(6) Dust attachment test

Ashes on the burned tip of 10 mm. long of a cigarette were dropped on a sheet of paper, crushed by a finger and put on the test rubber sheet 2 cm. away from its center. The rubber sheet was held up at a level by both hands and then, one of the hands is left off so that the rubber sheet hung down. Using the index finger, the sheet was given 3 taps with a constant pressure from the reverse side of the sheet at the portion where the ashes were dropped.

As a result, the ashes could be almost completely tapped off in the case of the rubber sheets of Examples 1 to 4. In the case of the rubber sheets of Comparative Examples 1 to 4, however, the ashes remained in the shape of a fan with the original position of ashes as its apex. More particularly, the amount of the ashes retained was much in the case of the non-halogenated rubber sheet of Comparative Example 1.

It is apparent from the foregoing results that dust is less liable to attach on the rubber sheet of the present invention than on the conventional rubber sheets (Comparative Examples 2 to 4) which are subjected to halogenation treatment in order to lessen the possibility of attachment of dust.

Examples 5 to 8

In the same manner as in Examples 1 to 4 except that the rubber compositions were changed to those shown in Table 12, rubber sheets for turntable were produced.

The physical constants of the resultant rubber sheets were measured in the same manner as in Examples 1 to 4. The results are also shown in Table 12.

TABLE 12

| Examples | 5 | 6 | 7 | 8 |
|---|---|---|---|---|
| Rubber Composition (in parts) | | | | |
| Norsorex (described above) | 80 | 75 | 80 | 100 |
| Nipol SBR 1712 (Note 1) | 20 | — | — | — |
| Esplene 505 (Note 2) | — | 25 | — | — |
| Nipol IR 2200 (Note 3) | — | — | 20 | — |
| White factice S | 420 | 330 | 320 | 210 |
| Sunthene 255 | 560 | 450 | 440 | 320 |
| Sunpar 110 (Note 4) | — | — | — | 30 |

TABLE 12-continued

| Examples | 5 | 6 | 7 | 8 |
|---|---|---|---|---|
| Sundex 790 (Note 5) | — | — | — | 40 |
| Dioctyl phthalate | — | 80 | — | 50 |
| FEF carbon | 40 | 80 | — | 40 |
| HAF carbon | — | — | 40 | — |
| MT carbon | — | — | — | 20 |
| Zinc oxide | 5 | 5 | 5 | 5 |
| Stearic acid | 1 | 1 | 1 | 1 |
| Sumilizer MDP | 1 | 1 | 1 | 1 |
| Sulfur | 2.5 | 2.5 | 2.5 | 2.5 |
| Sunceller CZ | 10 | 10 | 10 | 9 |
| Physical constants | | | | |
| A hardness (degree) | 5 | 7 | 5 | 8 |
| Impact resilience (%) | 67 | 55 | 59 | 54 |
| Tensile strength (kg./cm.$^2$) | 2 | 5 | 9 | 8 |
| Elongation (%) | 161 | 155 | 257 | 402 |
| Specific gravity | 0.945 | 0.979 | 0.959 | 1.015 |

(Note 1): Styrene-butadiene rubber made by Nippon Zeon Co., Ltd.
(Note 2): Ethylene-propylene-diene rubber made by Sumitomo Chemical Co., Ltd.
(Note 3): Isoprene rubber made by Nippon Zeon Co., Ltd.
(Note 4): Paraffinic oil made by Japan Sunoil Co., Ltd.
(Note 5): Aromatic oil made by Japan Sunoil Co., Ltd.

The rubber sheets obtained in Examples 5 to 8 also permitted reproducing excellent tone quality sounds likewise the rubber sheets obtained in Examples 1 to 4.

Examples 9 to 10

In the same manner as in Examples 1 to 4 except that the rubber compositions were changed to those shown in Table 13, rubber sheets for turntable were produced. The physical constants of the resulting rubber sheets were measured in the same manner as in Examples 1 to 4. The results are also shown in Table 13.

TABLE 13

| Examples | 9 | 10 |
|---|---|---|
| Rubber Composition (in parts) | | |
| Norsorex 150 NA | 250 | 250 |
| DOG factice F 10 (Note 1) | 240 | 300 |
| Sunthene 255 | 130 | 120 |
| Dioctyl phthalate | 10 | — |
| SRF carbon | 40 | — |
| MT carbon | — | 35 |
| Zinc oxide | 5 | 5 |
| Stearic acid | 1 | 1 |
| Antioxidant DDA (Note 2) | 1 | 1 |
| Suntight S (Note 3) | 1 | 1 |
| Sulfur | 2 | 2 |
| Sunceller CZ | 8 | 6 |
| Physical constants | | |
| A hardness (degree) | 18 | 23 |
| Impact resilience (%) | 71 | 73 |
| Tensile strength (kg./cm.$^2$) | 21 | 16 |
| Elongation (%) | 283 | 293 |
| Specific gravity | 0.997 | 0.999 |

(Note 1): Amber sulfur factice made by D.O.G. Deutsche Oelfabrick Ges. f. Chem. Erz. mbH & Co.
(Note 2): Diphenylamine antioxidant made by Bayer A.G.
(Note 3): Microcrystalline wax made by Seiko Kagaku Kabushiki Kaisha In the case that a glass sheet of about 300 g. weight was mounted on the respective rubber sheets of Examples 9 to 10, contact area occupied about 0.01% of the entire area of one surface of the rubber sheet.

The following tests were conducted on the rubber sheets of Examples 9 and 10.

(1) Tone quality test

This test was conducted in the same manner as in Examples 1 to 4 except that the test record and parameters were changed as follows: The results are shown in Tables 14 and 15 together with the results obtained on the rubber sheets of Example 4 and Comparative Examples 1 to 4.

Test record
Title of record: Bach: toccata and fugue, E. Power Biggs at the Thomas Church (CBS Sony Inc.)
Performer: E. Power Biggs (organ)
Program: Toccata and fugue in D minor
Parameters
(a) if peculiar sounds of a pipe organ are reproduced
(b) if treble is clear
(c) if bass is solemn
(d) if a melody is definitely separate from an accompaniment

TABLE 14

| Parameters | Example 9 | | | | Example 10 | | | | Example 4 | | | |
| --- | --- | --- | --- | --- | --- | --- | --- | --- | --- | --- | --- | --- |
| | A | B | C | D | A | B | C | D | A | B | C | D |
| Sounds of a pipe organ | 5 | 5 | 5 | 5 | 5 | 5 | 4 | 5 | 4 | 4 | 3 | 4 |
| Treble | 5 | 5 | 5 | 5 | 5 | 5 | 4 | 5 | 5 | 4 | 5 | 5 |
| Bass | 5 | 5 | 5 | 5 | 5 | 5 | 5 | 5 | 4 | 5 | 4 | 5 |
| Melody & accompaniment | 5 | 5 | 5 | 5 | 5 | 5 | 5 | 5 | 5 | 5 | 5 | 5 |
| Overall evaluation | 100 | 100 | 100 | 100 | 100 | 100 | 90 | 100 | 90 | 90 | 85 | 95 |
| Average | | 100 | | | | 98 | | | | 90 | | |

TABLE 15

| Parameters | Comparative Example 1 | | | | Comparative Example 2 | | | | Comparative Example 3 | | | | Comparative Example 4 | | | |
| --- | --- | --- | --- | --- | --- | --- | --- | --- | --- | --- | --- | --- | --- | --- | --- | --- |
| | A | B | C | D | A | B | C | D | A | B | C | D | A | B | C | D |
| Sounds of a pipe organ | 2 | 3 | 3 | 2 | 2 | 2 | 2 | 2 | 1 | 2 | 1 | 2 | 1 | 1 | 2 | 2 |
| Treble | 2 | 2 | 3 | 3 | 2 | 3 | 2 | 2 | 2 | 1 | 2 | 2 | 2 | 1 | 2 | 1 |
| Bass | 2 | 3 | 2 | 3 | 1 | 2 | 2 | 1 | 2 | 1 | 2 | 2 | 1 | 2 | 3 | 1 |
| Melody & accompaniment | 2 | 1 | 2 | 2 | 1 | 1 | 1 | 1 | 1 | 1 | 1 | 1 | 1 | 1 | 1 | 1 |
| Overall evaluation | 40 | 45 | 50 | 50 | 30 | 40 | 35 | 30 | 30 | 25 | 30 | 35 | 25 | 25 | 40 | 25 |
| Average | | 46 | | | | 34 | | | | 30 | | | | 29 | | |

(2) Howling test

The test was conducted in the same manner as in Examples 1 to 4 except that the test record was changed to that used in the above tone quality test and the test was carried out only in the case that the rubber sheet was mounted with the surface shown in FIG. 1 [the surface provided with the projections (3)] in contact with the record. The results are shown in Table 16 together with the results obtained on the rubber sheets of Example 4 and Comparative Examples 1 to 4.

TABLE 16

| | | Howling |
| --- | --- | --- |
| Examples | 9 | 10 |
| | 10 | 10 |
| | 4 | 10 |
| Comparative Example | 1 | 3 |
| " | 2 | 2 |
| " | 3 | 3 |
| " | 4 | 2 |

In the above tone quality and howling tests, the rubber sheets of the present invention (Examples 9 to 10) brought about outstandingly excellent results as compared with the conventional rubber sheets (Comparative Examples 1 to 4).

The rubber sheets of Examples 9 and 10 with A hardnesses of 18° and 23°, respectively, helped reproduce much better sounding sounds than the rubber sheet of Example 4 with a lower hardness of 9° in A hardness.

(3) Slip test

This test was carried out in the same manner as in Examples 1 to 4. As a result, the rubber sheets of Examples 9 and 10 were both qualified.

(4) Lift test

This test was carried out on the rubber sheet of Example 9 in the same manner as in Examples 1 to 4. As a result, the rubber sheet of Example 9 lifted up to 10 sheets (weight: 3.4 kg.) of the rubber sheet of Comparative Example 3.

(5) Scratch test

This test was carried out on the rubber sheet of Example 9 in the same manner as in Examples 1 to 4. As a result, faint marks were made on the rubber sheet of Example 9 after 30 min. but removed upon once rubbing by finger without leaving any trace.

(6) Dust attachment test

The test was carried out in the same manner as in Examples 1 to 4. As a result, substantially no ashes remained on the rubber sheets of Examples 9 and 10.

Examples 11 and 12

In the same manner as in Examples 1 to 4 except that the rubber compositions were changed to those shown in Table 17, rubber sheets for turntable were produced.

The physical constants of the resulting rubber sheets were measured in the same manner as in Examples 1 to 4. The results are shown in Table 18.

TABLE 17

| Rubber composition (in parts) | | |
| --- | --- | --- |
| | Examples | |
| Components | 11 | 12 |
| Norsorex 150 NA | 250 | 250 |
| DOG factice F 10 | 230 | 200 |
| Sunthene 255 | 400 | — |

TABLE 17-continued

| | Rubber composition (in parts) | |
|---|---|---|
| | | Examples |
| Components | 11 | 12 |
| Sundex 790 | — | 1,000 |
| Rapeseed oil | — | 15 |
| Dioctyl phthalate | 50 | 35 |
| FEF carbon | 50 | — |
| MT carbon | — | 50 |
| Zinc oxide | 5 | 5 |
| Stearic acid | 1 | 1 |
| Antioxidant DDA | 2 | 2 |
| Suntight S | 1 | 1 |
| Sulfur | 2.5 | 2.5 |
| Sunceller CZ | 8 | 10 |

TABLE 18

| Example | Hardness (degree) C hardness | Hardness (degree) F hardness | Impact resilience (%) | Tensile strength (kg./cm.$^2$) | Elongation (%) | Specific gravity |
|---|---|---|---|---|---|---|
| 11 | 11 | 73 | 63 | 6.5 | 387 | 0.977 |
| 12 | — | 31 | 51 | 0.3 | 490 | 1.004 |

The following tests were effected on the rubber sheets of Examples 11 and 12.

(1) Tone quality test

The test was carried out in the same manner as in Examples 1 to 4 except that the test record and parameters were changed as follows: The results are shown in Tables 19 and 20 together with the results obtained on the rubber sheets of Example 2 and Comparative Examples 1 to 4.

Test record
Title of record: "1812 Overture" by Tchaikovsky (Telarc Records)
Performer: The Cincinnati Symphony Orchestra
Conductor: Erich Kunzel
Parameters
(a) if sounds of a cannon are well reproduced
(b) if treble is not distorted
(c) if bass is well reproduced
(d) if the impressions of presence are sufficient

TABLE 19

| Parameters | Example 11 A | B | C | D | Example 12 A | B | C | D | Example 2 A | B | C | D |
|---|---|---|---|---|---|---|---|---|---|---|---|---|
| Sounds of a cannon | 5 | 5 | 5 | 4 | 4 | 5 | 4 | 5 | 4 | 4 | 4 | 3 |
| Distortion of treble | 5 | 4 | 5 | 5 | 5 | 4 | 5 | 5 | 5 | 4 | 5 | 5 |
| Bass | 5 | 5 | 5 | 5 | 5 | 5 | 5 | 4 | 4 | 5 | 5 | 5 |
| Presence | 5 | 5 | 5 | 5 | 5 | 5 | 5 | 4 | 5 | 4 | 5 | 5 |
| Overall evaluation | 100 | 95 | 100 | 95 | 95 | 95 | 95 | 90 | 90 | 85 | 95 | 90 |
| Average | 98 | | | | 94 | | | | 90 | | | |

TABLE 20

| Parameters | Comparative Example 1 A | B | C | D | Comparative Example 2 A | B | C | D | Comparative Example 3 A | B | C | D | Comparative Example 4 A | B | C | D |
|---|---|---|---|---|---|---|---|---|---|---|---|---|---|---|---|---|
| Sounds of a cannon | 2 | 2 | 2 | 2 | 2 | 1 | 2 | 2 | 1 | 2 | 2 | 1 | 1 | 2 | 2 | 2 |
| Distortion of treble | 2 | 1 | 2 | 2 | 2 | 2 | 3 | 2 | 2 | 1 | 2 | 3 | 1 | 2 | 2 | 2 |
| Bass | 3 | 3 | 3 | 3 | 3 | 2 | 3 | 3 | 2 | 2 | 3 | 2 | 2 | 3 | 3 | 2 |
| Presence | 3 | 4 | 2 | 4 | 2 | 2 | 1 | 2 | 3 | 2 | 3 | 2 | 3 | 2 | 2 | 2 |
| Overall evaluation | 50 | 50 | 45 | 55 | 45 | 35 | 45 | 45 | 40 | 35 | 50 | 40 | 35 | 45 | 45 | 40 |
| Average | 50 | | | | 43 | | | | 41 | | | | 41 | | | |

(2) Howling test

The test was conducted in the same manner as Examples 1 to 4 except that the test record was changed to that used in the above tone quality test and the test was carried out only in the case that the rubber sheet was mounted with the surface shown in FIG. 1 [the surface provided with the projections (3)] in contact with the record. The results are shown in Table 21 together with the results obtained on the rubber sheets of Example 2 and Comparative Examples 1 to 4.

TABLE 21

| | | Howling |
|---|---|---|
| Examples | 11 | 10 |
| | 12 | 9 |
| | 2 | 8 |
| Comparative Example | 1 | 4 |
| " | 2 | 3 |
| " | 3 | 3 |
| " | 4 | 2 |

In the above tone quality and howling tests, the rubber sheets of the present invention (Examples 11 and 12) brought about outstandingly excellent results as compared with the conventional rubber sheets (Comparative Examples 1 to 4).

The rubber sheets of Examples 11 and 12 with C hardness of 11° (F hardness of 73°) and F hardness of 31°, respectively, further prevented howling and helped reproduce sounds of superlow frequencies as compared with the rubber sheet of Example 2 with a higher hardness of 5° in A hardness.

(3) Slip test

This test was carried out in the same manner as in Examples 1 to 4. As a result, the rubber sheets of Examples 11 and 12 were both qualified.

(4) Scratch test

This test was carried out on the rubber sheet of Example 11 in the same manner as in Examples 1 to 4. As a result, faint marks were made after 30 min. but removed upon once rubbing by finger without leaving any trace.

(5) Dust attachment test

This test was carried out in the same manner as in Examples 1 to 4. As a result, substantially no ashes remained on the rubber sheets of Examples 11 and 12.

Examples 13 to 15

In the same manner as in Examples 1 to 4 except that the rubber compositions were changed to those shown in Table 22, rubber sheets for turntable were produced.

The physical constants of the resulting rubber sheets were measured in the same manner as in Examples 1 to 4. The results are shown in Table 23.

TABLE 22

| Rubber composition (in parts) | | | |
|---|---|---|---|
| | Examples | | |
| Components | 13 | 14 | 15 |
| Nipol SBR 1712 | 137.5 | — | — |
| Natural rubber | — | 100 | — |
| Baypren 112 (Note 1) | — | — | 100 |
| DOG factice F 10 | 200 | 250 | — |
| DOG factice NP 17 (Note 2) | — | — | 240 |
| Sunthene 255 | 200 | 110 | 200 |
| MT carbon | 20 | 50 | 45 |
| Zinc oxide | 5 | 5 | — |
| Magnesia | — | — | 4 |
| Stearic acid | 1 | 1 | 1 |
| Antioxidant DDA | 2 | 1 | 1 |
| Suntight S | 1 | 1 | 1 |
| Sulfur | 2 | 2 | 2 |
| Sunceller CZ | 4 | — | — |
| Nocceler DM (Note 3) | — | 2.7 | — |
| Nocceler D (Note 4) | — | 0.7 | — |
| Nocceler TT (Note 5) | — | 0.4 | — |
| Nocceler DT (Note 6) | — | — | 1.1 |
| Nocceler TS (Note 7) | — | — | 1.1 |

(Note 1): Chloroprene rubber made by Bayer A.G.
(Note 2): Amber sulfur factice made by D.O.G. Deutsche Oelfabrick Ges. f. Chem. Erz. mbh & Co.
(Note 3): Curing accelerator made by Ouchi Chemical Industry Co., Ltd.
(Note 4): Curing accelerator made by Ouchi Chemical Industry Co., Ltd.
(Note 5): Curing accelerator made by Ouchi Chemical Industry Co., Ltd.
(Note 6): Curing accelerator made by Ouchi Chemical Industry Co., Ltd.
(Note 7): Curing accelerator made by Ouchi Chemical Industry Co., Ltd.

TABLE 24

| | (Female vocal) | | | | | | | | | | | |
|---|---|---|---|---|---|---|---|---|---|---|---|---|
| | Example 13 | | | | Example 14 | | | | Example 15 | | | |
| Parameters | A | B | C | D | A | B | C | D | A | B | C | D |
| Nearness to human voices | 5 | 4 | 4 | 5 | 4 | 5 | 4 | 5 | 4 | 5 | 4 | 4 |
| Distortion of treble | 5 | 5 | 5 | 4 | 4 | 5 | 5 | 4 | 5 | 4 | 5 | 5 |
| Accompanying guitar | 5 | 5 | 5 | 5 | 5 | 5 | 4 | 5 | 4 | 5 | 5 | 5 |
| Presence | 5 | 5 | 4 | 5 | 5 | 4 | 5 | 5 | 5 | 5 | 4 | 5 |
| Overall evaluation | 100 | 95 | 90 | 95 | 90 | 95 | 90 | 95 | 90 | 95 | 90 | 95 |
| Average | 95 | | | | 93 | | | | 93 | | | |

TABLE 25

| | (Concerto) | | | | | | | | | | | |
|---|---|---|---|---|---|---|---|---|---|---|---|---|
| | Example 13 | | | | Example 14 | | | | Example 15 | | | |
| Parameters | A | B | C | D | A | B | C | D | A | B | C | D |
| Sounds of chords | 5 | 5 | 5 | 5 | 5 | 5 | 5 | 4 | 4 | 5 | 5 | 4 |
| Distortion of treble | 5 | 4 | 5 | 5 | 5 | 5 | 5 | 5 | 5 | 5 | 5 | 5 |
| Bass | 4 | 5 | 5 | 4 | 5 | 4 | 5 | 4 | 5 | 4 | 5 | 5 |
| Presence | 5 | 5 | 5 | 5 | 5 | 5 | 4 | 5 | 5 | 4 | 5 | 5 |
| Overall evaluation | 95 | 95 | 100 | 95 | 100 | 95 | 95 | 90 | 95 | 90 | 100 | 95 |
| Average | 96 | | | | 95 | | | | 95 | | | |

TABLE 26

| | (Flamenco guitar) | | | | | | | | | | | |
|---|---|---|---|---|---|---|---|---|---|---|---|---|
| | Example 13 | | | | Example 14 | | | | Example 15 | | | |
| Parameters | A | B | C | D | A | B | C | D | A | B | C | D |
| Sounds of chords | 5 | 5 | 5 | 4 | 5 | 4 | 5 | 5 | 5 | 4 | 4 | 4 |
| Distortion of treble | 5 | 4 | 5 | 5 | 5 | 5 | 4 | 5 | 5 | 5 | 5 | 5 |
| Beats of guitar | 4 | 5 | 5 | 5 | 5 | 5 | 5 | 4 | 4 | 5 | 5 | 4 |
| Presence | 5 | 5 | 5 | 5 | 5 | 5 | 5 | 5 | 5 | 5 | 5 | 5 |
| Overall evaluation | 95 | 95 | 100 | 95 | 100 | 95 | 95 | 95 | 95 | 95 | 95 | 90 |
| Average | 96 | | | | 96 | | | | 94 | | | |

TABLE 23

| Example | Hardness (degree) | | | Impact resilience (%) | Tensile strength (kg./cm.$^2$) | Elongation (%) | Specific gravity |
|---|---|---|---|---|---|---|---|
| | A hardness | C hardness | F hardness | | | | |
| 13 | 9 | 30 | — | 62 | 8 | 258 | 1.009 |
| 14 | 23 | 51 | — | 62 | 5.4 | 223 | 0.984 |
| 15 | — | 10 | 69 | 45 | 3.6 | 322 | 1.026 |

The following tests were effected on the rubber sheets of Examples 13 to 15.

(1) Tone quality test

This test was carried out in the same manner as in Examples 1 to 4. The results are shown in Tables 24 to 26.

(2) Howling test

The test was conducted in the same manner as in Examples 1 to 4 except that the test was carried out only in the case that the rubber sheet was mounted with the surface shown FIG. 1 [the surface provided with the projections (3)] in contact with the record. The results thereof are shown in Table 27.

TABLE 27

| Record | Examples | | |
|---|---|---|---|
| | 13 | 14 | 15 |
| Female vocal | 8 | 8 | 8 |
| Concerto | 9 | 8 | 8 |
| Flamenco guitar | 9 | 8 | 8 |

In the above tone quality and howling tests, the rubber sheets of the present invention (Examples 13 to 15) brought about outstandingly excellent effects as compared with the conventional rubber sheets [Comparative Examples 1 to 4 (see Tables 5, 7, 9 and 10)].

(3) Slip test

This test was carried out in the same manner as in Examples 1 to 4. As a result, all of the rubber sheets of Examples 13 to 15 were qualified.

(4) Lift test

This test was carried out on the rubber sheet of Example 13 in the same manner as in Examples 1 to 4. As a result, the rubber sheet of Example 13 lifted up to 6 sheets (weight: 2.0 kg.) of the rubber sheet of Comparative Example 3.

(5) Scratch test

This test was carried out on the rubber sheet of Example 13 in the same manner as in Examples 1 to 4. As a result, faint marks were made after 30 min. but removed upon once rubbing by finger.

(6) Dust attachment test

This test was carried out in the same manner as in Examples 1 to 4. As a result, substantially no ashes remained on the rubber sheets of Examples 13 to 15.

Examples 16 to 19

In the same manner as in Examples 1 to 4 except that the rubber compositions were changed to those shown in Table 28, rubber sheets for turntable were produced.

The physical constants of the resulting rubber sheets were measured in the same manner as in Examples 1 to 4. The results are shown in Table 29.

TABLE 28

| Components | Rubber composition (in parts) | | | |
|---|---|---|---|---|
| | Examples | | | |
| | 16 | 17 | 18 | 19 |
| Nipol SBR 1712 | 137.5 | — | — | — |
| Nipol IR 2200 | — | 100 | — | — |
| Nordel 1040 (Note 1) | — | — | 100 | — |
| Millathane 76 (Note 2) | — | — | — | 100 |
| DOG factice F 10 | 230 | 200 | 250 | — |
| DOG factice NP 17 | — | — | — | 200 |
| DOG factice DS SOFT (Note 3) | — | 15 | — | — |
| Sunthene 255 | 200 | 15 | 200 | 250 |
| Sunpar 110 | — | 70 | — | — |
| Thiokol TP-95 (Note 4) | — | — | — | 10 |
| SRF carbon | — | 5 | — | — |
| MT carbon | 60 | — | 50 | — |
| Light calcium carbonate | — | — | — | 10 |
| Zinc oxide | 5 | 5 | 5 | — |
| Zinc stearate | — | — | — | 0.5 |
| Stearic acid | 1 | 1 | 1 | — |
| Antioxidant DDA | 2 | 1 | 1 | — |
| Suntight S | 1 | 1 | 1 | — |
| Sulfur | 2 | 2.2 | 2.5 | 1.5 |
| Sunceller CZ | 4 | 2 | — | — |
| Nocceler DM | — | — | — | 3 |
| Nocceler TT | — | — | 1.2 | — |
| Nocceler M (Note 5) | — | — | 2 | 2 |
| Nocceler TRA (Note 6) | — | — | 1.2 | — |
| Thiokol ZC 456 (Note 7) | — | — | — | 1 |

(Note 1): Ethylene-propylene-diene copolymer made by E. I. Du Pont de Nemours & Co.
(Note 2): Urethane rubber made by Technical Sales & Engineering Inc.
(Note 3): Amber soft sulfur factice made by D.O.G. Deutsche Oelfabrick Ges. f. Chem. Erz. mbh & Co.
(Note 4): Plasticizer made by Thiokol Corp.
(Note 5): Curing accelerator made by Ouchi Chemical Industry Co., Ltd.
(Note 6): Curing accelerator made by Ouchi Chemical Industry Co., Ltd.
(Note 7): Curing accelerator made by Thiokol Corp.

TABLE 29

| Example | Hardness (degree) | | Impact resilience (%) | Tensile strength (kg./cm.$^2$) | Elongation (%) | Specific gravity |
|---|---|---|---|---|---|---|
| | A hardness | C hardness | | | | |
| 16 | 18 | 46 | 59 | 21 | 364 | 1.016 |
| 17 | 8 | 28 | 64 | 6 | 330 | 0.921 |
| 18 | 6 | 25 | 52 | 7 | 241 | 0.971 |
| 19 | 4 | 22 | 61 | 2 | 182 | 1.008 |

Likewise the rubber sheets of Examples 13 to 15, the rubber sheets of Examples 16 to 19 permitted reproducing excellent tone quality sounds.

I claim:

1. A rubber disc for a record player turntable which is a sheet-like cured molding of a rubber composition, said cured molding having a hardness within the range from 30° as measured with an A-type rubber hardness tester to 15° as measured with an F-type rubber hardness tester and an impact resilience of not less than 40%.

2. The rubber disc of claim 1, wherein the hardness is not more than 20° as measured with the A-type rubber hardness tester and not less than 30° as measured with the F-type rubber hardness tester and the impact resilience is not less than 50%.

3. The rubber disc of claim 1, wherein the hardness is more than 15° as measured with the A-type rubber hardness tester and not more than 30° as measured with the A-type rubber hardness tester and the impact resilience is not less than 50%.

4. The rubber disc of claim 1, wherein the hardness is from 1° to 15° as measured with the A-type rubber hardnesss tester.

5. The rubber disc of claim 1, wherein the hardness is less than 1° as measured with the A-type rubber hardness tester and not less than 15° as measured with the F-type rubber hardness tester.

6. The rubber disc of any one of claims 1, 2, 3, 4 and 5, wherein the cured molding is a cured molding of a rubber composition containing predominantly polynorbornene as a rubber component.

7. The rubber disc of any one of claims 1, 2, 3, 4 and 5, wherein the cured molding is a cured molding of a rubber composition containing predominantly as a rubber component at least one member selected from the group consisting of natural rubber, isoprene rubber, chloroprene rubber, styrene-butadiene rubber, butadiene rubber, butyl rubber, ethylene-propylene rubber, ethylene-propylene-diene rubber, nitrile rubber, acryl rubber, urethane rubber, chlorinated polyethylene, chlorosulfonated polyethylene, epichlorohydrin rubber, polysulfide rubber and silicone rubber.

8. The rubber disc of claim 1, wherein the rubber composition comprises (A) 100 parts by weight of a rubber component, (B) 1 to 2,000 parts by weight of a factice and (C) 20 to 2,000 parts by weight of a softening agent.

9. The rubber disc of claim 8, wherein the amount of the component (B) is from 5 to 2,000 parts by weight and the amount of the component (C) is from 50 to 2,000 parts by weight.

10. The rubber disc of claim 9, wherein the amount of the component (B) is from 100 to 1,500 parts by weight and the amount of the component (C) is from 200 to 1,500 parts by weight.

11. The rubber disc of any one of claims 8, 9 and 10, wherein the component (A) comprises predominantly polynorbornene.

12. The rubber disc of any one of claims 8, 9 and 10, wherein the component (A) comprises predominantly at least one member selected from the group consisting of natural rubber, isoprene rubber, chloroprene rubber, styrene-butadiene rubber, butadiene rubber, butyl rubber, ethylene-propylene rubber, ethylene-propylene-diene rubber, nitrile rubber, acryl rubber, urethane rubber, chlorinated polyethylene, chlorosulfonated polyethylene, epichlorohydrin rubber, polysulfide rubber and silicone rubber.

13. The rubber disc of claim 1, wherein one surface of the body of the rubber sheet is provided with a large number of projections.

14. The rubber disc of claim 13, wherein at least the head of each of the projections is ridge-shaped to make substantially a line contact with a turntable or a disc record.

15. The rubber disc of claim 13, wherein at least the head of each of the projections is pointed to make substantially a point contact with a turntable or a disc record.

16. The rubber disc of any one of claims 13, 14 and 15, wherein the height of the projections is from 0.1 to 5 mm.

17. The rubber disc of claim 16, wherein the height of the projections is from 0.3 to 1.8 mm.

18. The rubber disc of claim 13, wherein the projections are closely aligned with one another in a plurality of concentrically circular arrays.

19. The rubber disc of claim 18, wherein at least the head of each of the projections is ridge-shaped to make substantially a line contact with a turntable or a disc record.

20. The rubber disc of claim 19, wherein the ridges of the projections are aligned along the radical direction of the body of the rubber sheet.

21. The rubber disc of claim 18, wherein at least the head of each of the projections is pointed to make substantially a point contact with a turntable or a disc record.

22. The rubber disc of any one of claims 18, 19, 20 and 21, wherein the head of each projection in one of the concentrically circular arrays is arranged in correspondence with a valley between the two adjacent projections in the adjacent concentrically circular array in the radial direction of the body of the rubber sheet.

23. The rubber disc of claim 22, wherein, when being mounted with the surface provided with the projections in contact with a disc record and the other surface in contact with a turntable, the projections are highest in the most inner concentrically circular array and lower gradually in the direction toward outer arrays of the projections and air is confined within a space, over the central portion of the body of the rubber sheet, defined by the most inner concentrically circular array of the projections and the disc record.

24. The rubber disc of claim 23, wherein the surface to be in contact with the turntable is provided with a plurality of concentrically circular grooves in correspondence with the plurality of the concentrically circular arrays of the projections and air is confined at least in the most inner groove.

25. The rubber disc of claim 1, which is a sheet-like cured molding of a rubber composition comprising (A) 100 parts by weight of polynorbornene alone or a mixture thereof with other rubber component, (B) 5 to 500 parts by weight of a white factice alone or a mixture thereof with other factice and (C) 200 to 1,000 parts by weight of at least one oil selected from the group consisting of aromatic oils, naphthenic oils, paraffinic oils, vegetable oils and animal oils, said cured molding having a hardness of 1° to 15° as measured with the A-type rubber hardness tester, a tensile strength of 1 to 50 kg./cm$^2$., an elongation of 120 to 1,000%, an impact resilience of 40 to 90% and a specific gravity of 0.93 to 1.05 and one surface of the body of the rubber sheet being provided with projections with a height of 0.3 to 1.8 mm. closely aligned with one another in a plurality of concentrically circular arrays.

* * * * *